US005998543A

United States Patent [19]
Collins et al.

[11] Patent Number: 5,998,543
[45] Date of Patent: Dec. 7, 1999

[54] STABLE AMINO-CONTAINING POLYMER LATEX BLENDS

[75] Inventors: Martha Jean Collins, Blountville; James Wayne Taylor, Kingsport, both of Tenn.

[73] Assignee: Eastman Chemical Company, Kingsport, Tenn.

[21] Appl. No.: 08/861,431

[22] Filed: May 21, 1997

Related U.S. Application Data

[60] Provisional application No. 60/018,423, May 28, 1996, provisional application No. 60/018,424, May 28, 1996, and provisional application No. 60/028,444, Oct. 10, 1996.

[51] Int. Cl.$^6$ ............................ C08L 39/00; C08L 57/00
[52] U.S. Cl. ............................ 524/808; 524/820; 525/77
[58] Field of Search ............................ 525/77; 524/521, 524/522, 547, 555, 808, 820

[56] References Cited

U.S. PATENT DOCUMENTS

| | | | |
|---|---|---|---|
| 3,113,038 | 12/1963 | Lattarulo et al. | 117/140 |
| 3,261,797 | 7/1966 | McDowell et al. | 260/29.6 |
| 3,290,417 | 12/1966 | Christenson et al. | 260/901 |
| 3,325,443 | 6/1967 | Christenson et al. | 260/41 |
| 3,356,627 | 12/1967 | Scott | 260/29.6 |
| 3,386,939 | 6/1968 | Mesee et al. | 260/29.3 |
| 3,483,149 | 12/1969 | Gresenz et al. | 260/18 |
| 3,553,116 | 1/1971 | Kaplan et al. | 260/17 |
| 3,607,834 | 9/1971 | Marx et al. | 260/63 R |
| 3,639,327 | 2/1972 | Drelich | 260/29.6 NR |
| 3,678,013 | 7/1972 | Sherwood et al. | 260/77.5 R |
| 3,679,564 | 7/1972 | Dowbenko et al. | 204/181 |
| 3,725,124 | 4/1973 | Gorton et al. | 117/138.8 |
| 3,927,206 | 12/1975 | Blank et al. | 424/81 |
| 4,136,067 | 1/1979 | Reed et al. | 521/32 |
| 4,158,725 | 6/1979 | Nishimura et al. | 526/52.1 |
| 4,210,565 | 7/1980 | Emmons et al. | 260/29.6 TA |
| 4,239,893 | 12/1980 | Pigerol et al. | 546/321 |
| 4,241,682 | 12/1980 | Kondstandt | 114/67 R |
| 4,244,850 | 1/1981 | Mylonakis | 260/29.6 M |
| 4,535,128 | 8/1985 | Umemoto et al. | 525/162 |
| 4,812,541 | 3/1989 | Mallya et al. | 526/264 |
| 4,820,863 | 4/1989 | Taylor | 560/115 |
| 4,855,349 | 8/1989 | Ingle | 524/432 |
| 4,906,684 | 3/1990 | Say | 524/548 |
| 4,908,229 | 3/1990 | Kissel | 427/54.1 |
| 4,908,403 | 3/1990 | Spada et al. | 524/818 |
| 4,987,186 | 1/1991 | Akiyama et al. | 525/107 |
| 4,988,762 | 1/1991 | Overbeek et al. | 524/839 |
| 5,002,998 | 3/1991 | Carey et al. | 524/555 |
| 5,021,469 | 6/1991 | Langerbeins et al. | 523/201 |
| 5,053,441 | 10/1991 | Biale | 523/201 |
| 5,055,506 | 10/1991 | Knutson | 524/100 |
| 5,073,445 | 12/1991 | Ingle | 428/314.4 |

(List continued on next page.)

FOREIGN PATENT DOCUMENTS

| | | |
|---|---|---|
| 341886 | 11/1989 | European Pat. Off. . |
| 358358 | 3/1990 | European Pat. Off. . |
| 390370 | 10/1990 | European Pat. Off. . |
| 483915 | 5/1992 | European Pat. Off. . |
| 0 552 469 A2 | 7/1993 | European Pat. Off. . |
| 555774 | 8/1993 | European Pat. Off. . |
| 705855 | 4/1996 | European Pat. Off. . |
| 2535372 | 2/1977 | Germany . |
| 3713511 | 12/1987 | Germany . |
| 61-21171 | 1/1986 | Japan . |
| 1-229242 | 9/1989 | Japan . |
| 3-6236 | 1/1991 | Japan . |
| 4-189874 | 7/1992 | Japan . |
| 1151479 | 5/1969 | United Kingdom . |
| WO 91/14715 | 10/1991 | WIPO . |
| WO 95/00573 | 1/1995 | WIPO . |
| W095/09209 | 4/1995 | WIPO . |
| WO 96/16998 | 6/1996 | WIPO . |
| WO 96/32424 A2 | 10/1996 | WIPO . |

OTHER PUBLICATIONS

D. Horn, "Polyethylenimine–Physicochemical Properties and Applications" 1980.
Nishihata et al., "Formation and Hydrolysis of Enamine in Aqueous Solution" Chem. Pharm. Bull., Jan. 26,1984.
Rector et al., "Applications for the Acetoacetyl Functionality in Thermoset Coatings" Feb. 3, 1988.
Lee et al., "Effects of Surfactants and Polymerization Methods On The Morphology of Particles Formed in 'Core–Shell' Emulsion Polymerization of Methyl Methacrylate and Styrene" Makromol. Chem., Sept. 8, 1989.
"For Your Unlimited Imagination: Polymin (Polyethylenimine)" 1992 BASF Corporation.
Moszner et al. "Reaction behaviour of monomeric β–ketoesters" Polymer Bulletin, 1994.
Keith M. Moody, "Waterborne Acrylic Emulsion Using AAEM"Technical Tips, Eastman Kodak Company Sept. 1, 1995.
Derwent Abstract of JP03020302, Jan. 29, 1991.
Derwent Abstract of JP60127376, Jul. 8, 1995.
Geurink et al, "Analytical aspects and film properties of two–pack acetoacetate functional laxtexes," *Progress in Organic Coatings*, vol. 27, Jan.–Apr. 1996, pp. 73–78.

*Primary Examiner*—Veronica P. Hoke
*Attorney, Agent, or Firm*—Rose M. Allen; Harry J. Gwinnell

[57] ABSTRACT

This invention provides the composition, preparation, and end-use of waterborne crosslinking technology based compositions prepared from water-based latexes. The invention provides a water-based latex comprising dispersed, waterborne amino-functional polymer particles; dispsered, waterborne acetoacetoxy-functional polymer particles; and water. In a preferred embodiment, a latex of the invention comprises dipsered, waterborne polymeric (polyamino)enamine (PPAE) particles; dispersed, waterborne acetoacetoxy-functional polymer particles; and water. The PPAE is the reaction product of a surfactant-stabilized acetoacetoxy-functional polymer (SAAP) and a poly(alkylenimine). The water-based latexes of the invetion provide stable emulsions containing a blend of waterborne polymer particles which undergo crosslinking upon film formation. The latex films or coatings may be cured at ambient temperatures or may be thermally cured. The latex is useful in variety of coating compositons such as, for example, paints, inks, sealants, and adhesives.

28 Claims, 6 Drawing Sheets

U.S. PATENT DOCUMENTS

| | | | |
|---|---|---|---|
| 5,100,969 | 3/1992 | Yamamoto et al. | 525/327.3 |
| 5,108,575 | 4/1992 | Chung et al. | 204/181.7 |
| 5,185,397 | 2/1993 | Biale | 524/820 |
| 5,202,375 | 4/1993 | Biale | 524/562 |
| 5,227,413 | 7/1993 | Mitra | 523/116 |
| 5,242,978 | 9/1993 | Muller et al. | 525/102 |
| 5,244,963 | 9/1993 | Biale | 524/555 |
| 5,246,984 | 9/1993 | Darwen et al. | 523/404 |
| 5,247,040 | 9/1993 | Amick et al. | 526/286 |
| 5,270,380 | 12/1993 | Adamson et al. | 524/556 |
| 5,277,978 | 1/1994 | Feustel et al. | 428/402 |
| 5,296,530 | 3/1994 | Bors et al. | 524/558 |
| 5,308,890 | 5/1994 | Snyder | 523/201 |
| 5,344,675 | 9/1994 | Snyder | 427/388.4 |
| 5,349,026 | 9/1994 | Emmons et al. | 525/328.6 |
| 5,362,816 | 11/1994 | Snyder et al. | 525/329.9 |
| 5,364,891 | 11/1994 | Pears et al. | 522/149 |
| 5,371,148 | 12/1994 | Taylor et al. | 525/293 |
| 5,391,624 | 2/1995 | Rasoul et al. | 525/216 |
| 5,414,041 | 5/1995 | Larson et al. | 524/589 |
| 5,426,129 | 6/1995 | Emmons et al. | 522/6 |
| 5,484,849 | 1/1996 | Bors et al. | 525/167.5 |
| 5,494,961 | 2/1996 | Lavoie et al. | 525/102 |
| 5,494,975 | 2/1996 | Lavoie et al. | 525/928.6 |
| 5,498,659 | 3/1996 | Esser | 524/549 |
| 5,525,662 | 6/1996 | Lavoie et al. | 524/558 |
| 5,534,310 | 7/1996 | Rokowski et al. | 427/494 |
| 5,539,073 | 7/1996 | Taylor et al. | 524/553 |
| 5,541,251 | 7/1996 | Bontinck et al. | 524/507 |
| 5,548,024 | 8/1996 | Lavoie et al. | 525/102 |
| 5,559,192 | 9/1996 | Bors et al. | 525/300 |
| 5,562,953 | 10/1996 | Bors et al. | 427/558 |
| 5,605,722 | 2/1997 | Esser | 427/388.4 |
| 5,605,952 | 2/1997 | Esser | 524/522 |
| 5,605,953 | 2/1997 | Esser | 524/522 |
| 5,609,965 | 3/1997 | Esser | 428/522 |
| 5,616,764 | 4/1997 | Lavoie et al. | 556/482 |
| 5,661,212 | 8/1997 | Lear et al. | 524/555 |
| 5,672,379 | 9/1997 | Schall et al. | 427/137 |
| 5,763,546 | 6/1998 | Jung et al. | 525/313 |
| 5,767,199 | 6/1998 | Bore et al. | 525/153 |
| 5,783,626 | 7/1998 | Taylor et al. | 524/555 |

Figure 2.

STABLE AMINO-CONTAINING POLYMER LATEX BLENDS

This application claims benefit of Provisional Application Nos. 60/018,423 filed May 28, 1996; 60/018,424 filed May 28, 1996, and 60/028/444 filed Oct. 10, 1996.

FIELD OF THE INVENTION

This invention belongs to the field of emulsion chemistry. In particular, it relates to a blend of different waterborne polymers which are useful in a variety of coating compositions.

BACKGROUND OF THE INVENTION

In an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in solvent-based compositions. While the move from organic solvent-based to aqueous compositions brings health and safety benefits, the aqueous coating compositions must meet or exceed the performance standards expected from solvent-based compositions. The need to meet or exceed such performance standards places a premium on the characteristics and properties of waterborne polymer compositions used in aqueous coating compositions.

Waterborne polymer having various functional groups have been used to impart and achieve desired properties to a particular coating composition. For example, a coating composition should exhibit good film formation, print and block resistance, as well as adhesion and tensile properties. Polymers having acetoacetoxy- and enamine-functional groups represent one example of waterborne polymers which have such properties, may carry different functional groups, and are useful in aqueous coating compositions.

U.S. Pat. No. 5,296,530 discloses a quick-curing coating prepared from a polymer having acetoacetyl groups, in which substantially all of the acetoacetyl groups have been converted to enamine functional groups. This conversion occurs, for example, by treatment with ammonia or a primary amine. Coatings so prepared cure more quickly under sunlight or ultraviolet light than coatings which contain the acetoacetyl functional polymer but which have not been converted to an enamine form.

U.S. Pat. Nos. 5,484,975 and 5,525,662 describe the preparation of polymers containing functional acetoacetate groups and then, following the polymerization, reacting the acetoacetate group with a functional amine to form an enamine. The resulting polymers are reported to have a variety of uses including coatings, sealants, adhesives, and saturant applications.

U.S. Pat. No. 5,498,659 discloses polymeric formulations comprising an aqueous carrier, at least one polymeric ingredient, a non-polymeric polyfunctional amine, and a base. The polymeric ingredient has both acid-functional and acetoacetoxy-type functional moieties. The aqueous polymeric formulations produce crosslinked polymeric surface coatings on a substrate.

Japanese Patent 61-21171 describes a fast-curing adhesive consisting of two separate liquids. The first liquid is an aqueous solution and/or aqueous emulsion of a polymer compound containing an acetoacetyl group. The second liquid consists of polyethylene imine.

Even with current waterborne polymer formulations, a need remains for improved aqueous coating compositions and waterborne polymers for use in those compositions. In particular, a need exists for waterborne polymer compositions which may formulated as a single, stable composition but which undergo crosslinking upon film formation imparting one or more desired properties to the resulting coating. The present invention meets such needs.

SUMMARY OF THE INVENTION

This invention provides a water-based latex comprising dispersed, waterborne amino-functional polymer particles; dispersed, waterborne acetoacetoxy-functional polymer particles; and water. In a preferred embodiment, a latex of the invention comprises dispersed, waterborne polymeric (polyamino)enamine (PPAE) particles; dispersed, waterborne acetoacetoxy-functional polymer particles; and water. The PPAE is the reaction product of a surfactant-stabilized acetoacetoxy-functional polymer (SAAP) and a poly (alkylenimine). The water-based latexes of the invention provide stable emulsions containing a blend of waterborne polymer particles which undergo crosslinking upon film formation. The latex films or coatings may be cured at ambient temperatures or may be thermally cured. The latex is useful in a variety of coating compositions such as, for example, paints, inks, sealants, and adhesives.

BRIEF DESCRIPTION OF THE DRAWINGS

FIG. 2 depicts constant contour plots of methyl ethyl ketone double rubs as a function of latex particle size.

DETAILED DESCRIPTION OF THE INVENTION

Figure 1:
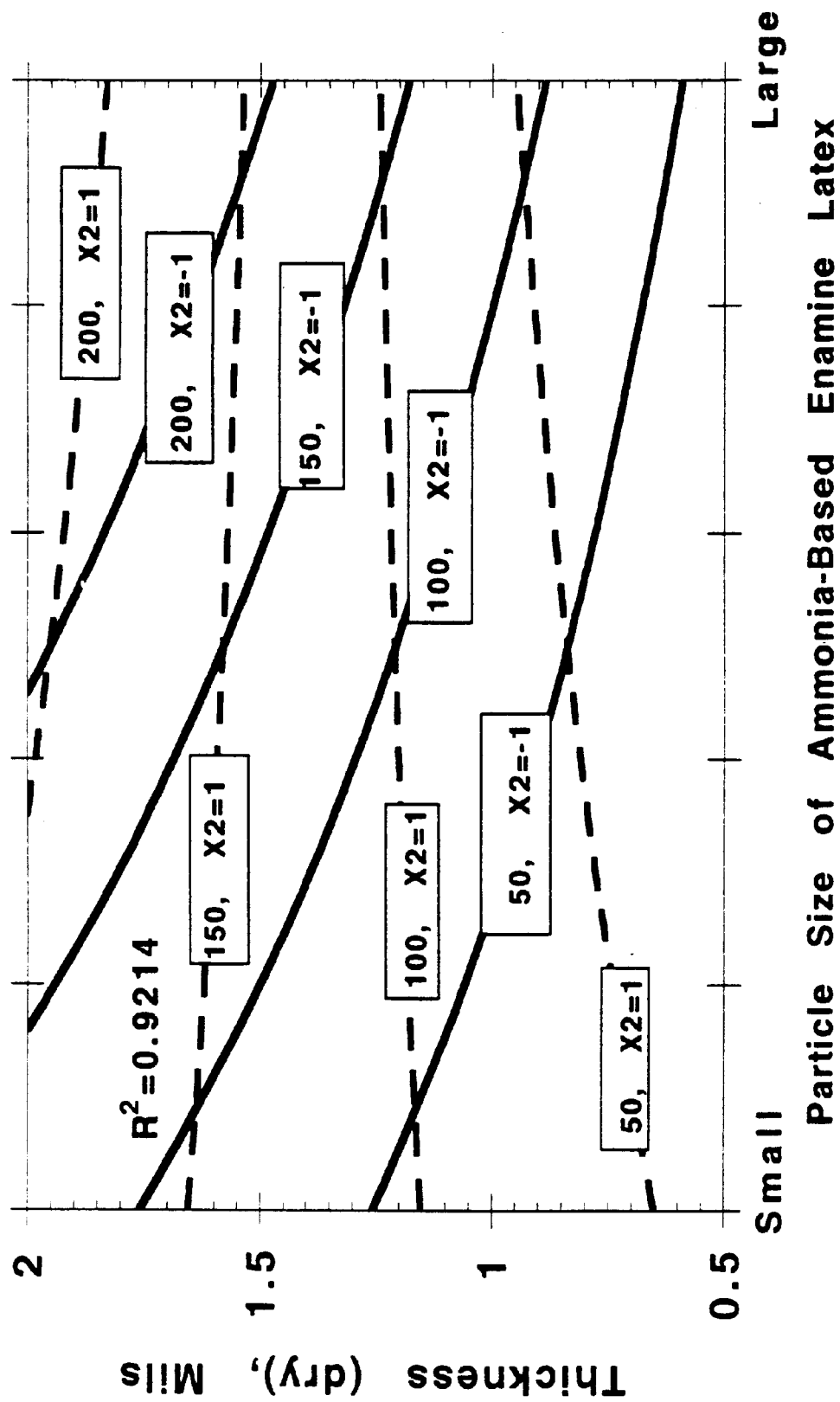
FIG. 1 depicts constant contour plots of methyl ethyl ketone double rubs as a function of ammonia-based enamine-functional polymer latexes and dry film thickness.

The present invention provides a water-based latex. In one embodiment, the latex affords a stable, emulsion containing a blend (or mixture) of dispersed, waterborne polymer particles which undergo crosslinking upon film formation. Latexes of the invention are stable when stored at temperatures at or moderately above room temperature. Yet, a film or coating formed from a latex of the invention may be cured at room temperature (ambient cure) or at elevated temperatures (thermal cure). A water-based latex comprises dispersed, waterborne amino-functional polymer particles; dispersed, waterborne acetoacetoxy-functional polymer particles, and water. In other words, a water-based latex of the invention is an aqueous dispersion containing separate waterborne amino-functional polymer particles and separate waterborne acetoacetoxy-functional polymer particles.

In the water-based latexes of the invention, the polymers generally exist as particles dispersed in water. The particles may be structured or unstructured. Structured particles include, but are not limited to, core/shell particles and gradient particles. The particle size of the polymers may range from about 25 to about 500 nm. Preferred particle sizes for small particles range from about 25 to about 100 nm, and more preferably from about 45 to about 80 nm. For large particles, preferred particles sizes range from about 110 to about 450 nm.

The polymer particles generally have a spherical shape. In a preferred embodiment, the generally spherical polymeric particle has a core portion and a shell portion. The core/shell polymer particles may also be prepared in a multilobe form, a peanut shell, an acorn form, or a raspberry form. It is further preferred in such particles that the core portion comprises about 20% to about 80% of the total weight of said particle and the shell portion comprises about 80% to about 20% of the total weight volume of the particle.

The Amino-functional Polymer

Polymers having amino (NH) groups available to react with the acetoacetoxy-functional polymer upon film formation may be used as an amino-functional polymer in a water-based latex of the invention. The amino groups may be primary or secondary amines. In general, the amino groups should be present at or near the surface of the polymer particle to react with the acetoacetoxy-functional polymer. The amino-functional polymer should contain a sufficient number of amino groups to permit efficient crosslinking with the acetoacetoxy-functional polymer. Exemplary amino-functional polymers include, but are not limited to, polymeric (polyamino)enamines and polymers prepared by reacting aziridines with carboxylic acid-containing latexes such as described in U.S. Pat. No. No. 3,261,796.

Polymeric (polyamino)enamines represent a particularly preferred group of amino-functional polymers for use in a water-based latex according to the invention. Reacting a surfactant-containing acetoacetoxy-functional polymer (SAAP) with ammonia, a primary or secondary amine yields a surfactant-containing enamine-functional polymer of the invention. A polymeric (polyamino)enamine (PPAE) results from the reaction of a SAAP with a poly(alkylenimine). Polymeric (polyamino)enamines represent a particularly preferred group of amino-functional polymers for use in a waterborne polymer composition according to the invention. These various polymers according to the invention, their preparation, and the related preferred embodiments are discussed below.

The SAAP may be prepared by free radical emulsion polymerization of a non-acid vinyl monomer having an acetoacetoxy functionality such as those of Formula (1) below with at least one non-self-polymerizing, surface-active vinyl monomer and other non-acid vinyl monomers. This affords water-based dispersion of surfactant-containing polymer particles with the polymer having pendant acetoacetoxy groups. As used here, a non-acid vinyl monomer is an ethylenically-unsaturated, non-carboxylic acid-containing monomer. A pendant acetoacetoxy group is not strictly limited to those at the termini of the polymer. Pendant acetoacetoxy groups also include groups attached to the polymer's backbone and available for further reaction.

The SAAP preferably contains about 1 to about 40 weight percent acetoacetoxy-functional monomers such as those of Formula (1) below, about 0.05 to about 20 weight percent of at least one non-self-polymerizing, surface-active vinyl monomer and about 60 to about 90 weight percent of other non-acid vinyl monomers. The weight percentage is based on the total amount of monomer. More preferably, the SAAP has about 10 to about 25 weight percent acetoacetoxy monomers, about 0.1 to about 10 weight percent of at least one non-self-polymerizing, surface-active vinyl monomer and about 75 to about 90 weight percent of other vinyl monomers.

The water-based emulsion polymerization to prepare the SAAP preferably occurs in the presence of a nonionic surfactant and an anionic surfactant. The nonionic surfactant may be present in amounts ranging from about 0.25 to about 5 phr, and the anionic surfactant in amounts ranging from about 0.1 to 1 phr. The unit "phr" defines the grams dry weight of the recited component, for example the surfactant, per 100 grams dry weight of the resin, where the "resin" includes all polymerization components excluding water. Aspects of this emulsion polymerization and preferred embodiments are discussed below.

Any non-acid vinyl monomer having acetoacetoxy-type functionality may be used to prepare a polymer of the invention. Of such monomers, preferred monomers are those of Formula (1).

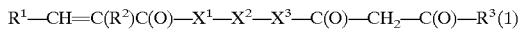

$$R^1-CH=C(R^2)C(O)-X^1-X^2-X^3-C(O)-CH_2-C(O)-R^3 \quad (1)$$

For an acetoacetoxy-type monomer of Formula (1), $R^1$ is a hydrogen or halogen. $R^2$ is a hydrogen, halogen, $C_1-C_6$ alkylthio group, or Cl-$C_6$ alkyl group. $R^3$ is a $C_1-C_6$ alkyl group. $X^1$ and $X^3$ are independently O, S, or a group of the formula —N(R')—, where R' is a $C_1-C_6$ alkyl group. $X^2$ is a $C_2-C_{12}$ alklylene group or $C_3-C_{12}$ cycloalkylene group. The alkyl and alkylene groups described here and throughout the specification may be straight or branched groups. Preferred monomers of Formula (1) are acetoacetoxyethyl methacrylate, acetoacetoxyethyl acrylate, acetoacetoxy (methyl)ethyl acrylate, acetoacetoxypropyl acrylate, allyl acetoacetate, acetoacetamidoethyl (meth)acrylate, and acetoacetoxybutyl acrylate. Acetoacetoxyethyl methacrylate (AAEM) represents a particularly preferred monomer of Formula (1).

Suitable non-acid vinyl monomers which may be used, for example, include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; 2-ethylhexyl methacrylate; octyl acrylate; octyl methacrylate; iso-octyl acrylate; iso-octyl methacrylate; trimethylolpropyl triacrylate; styrene; α-methyl styrene; glycidyl methacrylate; carbodiimide methacrylate; $C_1-C_{18}$ alkyl crotonates; di-n-butyl maleate; di-octylmaleate; allyl methacrylate; di-allyl maleate; di-allylnalonate; methoxybutenyl methacrylate; isobomyl methacrylate; hydroxybutenyl methacrylate; hydroxyethyl (meth)acrylate; hydroxypropyl (meth) acrylate; acrylonitrile, vinyl chloride; ethylene; vinyl ethylene carbonate; epoxy butene; 3,4-dihydroxybutene; hydroxyethyl (meth)acrylate; methacrylamide; acrylamide; butyl acrylamide; ethyl acrylamide; vinyl (meth)acrylate; isopropenyl (meth)acrylate; cycloaliphaticepoxy (meth) acrylates; and ethylformamide. Such monomers are described in "The Brandon Worldwide Monomer Reference Guide and Sourcebook" Second Edition, 1992, Brandon Associates, Merrimack, N.H.; and in "Polymers and Monomers", the 1996–1997 Catalog from Polyscience, Inc., Warrington, Pa.

To increase polymer stability, a small amount (about 0.4 phr) of sodium 2-acrylamido-2-methylpropane sulfonate, (AMPS) and other stabilizing monomers may be incorporated into the SAAP. Adding such stabilizing monomers to the polymer shell, for example, aids in preventing flocculation upon the addition of a polyalkylenimine to form a PPAE. High levels of such stabilizing monomers may create water membrane layers between polymer particles in the latex or disrupt film formation. AMPS is available from Lubrizol Corporation under the LUBRIZOL 2405 Trade name.

Vinyl esters of the general Formula (2) represent further examples of non-acid vinyl monomers:

$$RCH=CH-O-C(O)-C(R)_3 \quad (2)$$

In Formula (2), R is independently hydrogen or an alkyl group of up to 12 carbon atoms. Particular monomers of Formula (2) include $CH_2=CH-O-C(O)-CH_3$, $CH_2=CH-O-C(O)-C(CH_3)_3$, $CH_2=CH-O-C(O)-CH(C_2H_5)(C_4H_9)$, and $CH_2=CH-O-C(O)-CH_2CH_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

As a further preferred embodiment, the SAAP may also incorporate nitrogen-containing, non-acid vinyl monomers known to promote wet adhesion. Exemplary wet adhesion monomers include, for example, t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2-methacryloyloxy-ethyl)ethylene urea. N-(2-methacryloyloxyethyl)ethylene urea is available from RohmTech as 50% solution in water under the Rohamere 6852-O trade name and as a 25% solution in water under the Rohamere 6844 trade name. N-(2-methacrylamidoethyl)ethylene urea is available from Rhone-Poulenc under the WAM trade name.

Small amounts of acid vinyl monomers may also be used to prepare an SAAP according to the invention. Such acid vinyl monomers include, for example, acrylic acid, methacrylic acid, itaconic acid, crotonic acid, and monovinyl adipate. Incorporating acid vinyl monomers into the SAAP may increase the viscosity of the resulting latex and may have a detrimental effect on the formation of an enamine-functional polymer according to the invention. Generally these monomers are used in small amounts. Preferably, the amount of acid vinyl monomers may range, for example, from 0 to 5 phr. Greater amounts may be used to achieve a desired effect, such as increased viscosity.

Preparation of the SAAP reacts non-acid vinyl monomers, such as described above, with at least one non-self-polymerizable, surface-active vinyl monomer (also known as a non-self-polymerizable ethylenically-unsaturated surfactant or a reactive surfactant). A non-self-polymerizable surfactant monomer, rather than polymerizing with itself to form a separate polymeric surfactant, is substantially (preferably completely) incorporated into the polymer of the invention. Thus, the surfactant becomes part of the polymer. Non-self-polymerizing surfactants possessing, for example, propenylphenyl or allyl groups are preferred. Examples include surface active monomers sold by PPG Industries, Inc., as MAZON® SAM 181, 183, 184, 211 surfactants which are anionic sulfates or sulfonates and MAZON® SAM 185-187 surfactants which are nonionic surfactants. Other non-self-polymerizing, surface-active vinyl monomers include the macro monomers sold by Daiichi Kogyo Seiyaku under the names NIOGEN RN, AQUARON or HITENOL surfactants. These include polyoxyethylene alkyl phenyl ether compounds of the general formulae (3), (4), and (5):

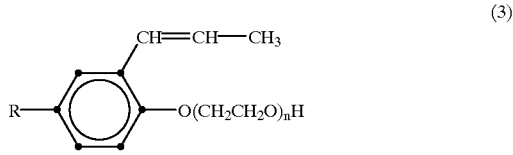

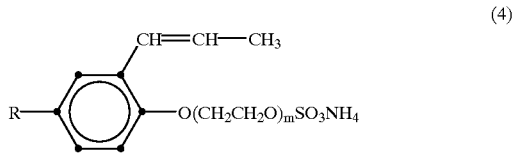

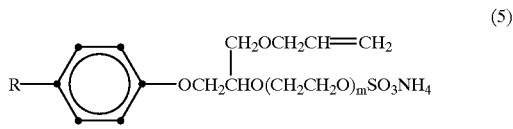

In Formulae (3), (4), and (5), R is nonyl or octyl and n and m are preferably integers of from 15 to 50 and 15 to 40, respectively. More preferably, n ranges from 20 to 40, and m from 15 to 25. HITENOL RN, HITENOL HS-20 and HITENOL A-10 products are particularly preferred non-self-polymerizing, surface-active monomers. Other such polymerizable surfactants include the sodium alkyl allyl sulfosuccinate sold by Henkel, under the trade name TREM LF-40 surfactant.

The SAAP (as well as other polymers useful in the invention) may be prepared using emulsion polymerization techniques known in the art. The polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, buffers, and catalysts, known in the art of emulsion polymerization, may be used to prepare the polymers.

Exemplary chain transfer agents are butyl mercaptan, dodecyl mercaptan mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated here by reference. In particular, 2-ethylhexyl 3-mercaptopropionate represents a preferred chain transfer agent.

Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

As discussed above, the emulsion polymerization to prepare the SAAP preferably occurs in water and in the presence of a nonionic surfactant and/or an anionic surfactant. Suitable nonionic surfactants include surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, and triisopropyl phenol. Preferred nonionic surfactants are the TERGITOL 15-S-40 and TERGITOL NP-40 surfactants available from Union Carbide. TERGITOL 15-S-40 surfactant (CAS # 68131-40-8) is a reaction product of a mixture of 11-15 carbon, linear secondary alcohols and ethylene oxide. TERGITOL NP-40 surfactant is the reaction product of a nonylphenol and about 40 moles of ethylene oxide. Another preferred nonionic surfactant is SURFYNOL 485 surfactant available from Air Products.

Anionic surfactants which may be used in the invention include surfactants such as alkali metal or ammonium salts of alkyl, aryl or alkylaryl sulfonates, sulfates, phosphates, and the like. These anionic surfactants include, for example, sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like. AEROSOL 18 surfactant, a 35% solution of N-octyldecyl sulfosuccinimate in water and AEROSOL OT-75 surfactant, a 75% solution of sodium dioctyl sulfosuccinate in water, from Cytech are preferred anionic surfactants.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413. Cellulosics and polyvinyl alcohols may also be used.

To form a PPAE, a SAAP is reacted with a poly (alkylenimine). In general, a poly(alkylenimine) contains primary, secondary, and tertiary amine groups. Primary and secondary amine groups of the poly(alkylenimine) react with the pendant acetoacetoxy groups on the SAAP to form enamine linkages yielding a polymeric (polyamino)enamine or PPAE.

A poly(alkylenimine) for use in the invention may have a weight average molecular weight of about 400 to about 750,000. The poly(alkylenimine) is preferably a poly (ethylenimine) (PEI) and more preferably PEI having a weight average molecular weight of about 800 to about 25,000. Such PEI compounds are commercially available from many sources and include POLYMIN poly (ethylenimine) and LUPASOL poly(ethylenimine) available from BASF Corporation. BASF polyethylenimine product literature reports the ratio of primary:secondary:tertiary amine groups to be about 1:2:1. A preferred PEI, LUPASOL G35 poly(ethylenimine), has a molecular weight of about 2,000 and a ratio of primary:secondary:tertiary amine groups of about 1.5:1.4:1.

The reaction to form the PPAE may be accomplished by adding, with stirring, the appropriate poly(alkylenimine) to an emulsion of the SAAP. Sufficient poly(alkylenimine) should be used to achieve a molar ratio of NH groups to acetoacetoxy groups of about 1 to about 8 and preferably a molar ratio from about 2 to about 5. The amount of poly (alkylenimine) added to the polymer having pendant acetoacetoxy groups may range from about 5 phr (grams dry weight poly(alkylenimine) to 100 grams dry weight resin) to about 30 phr and preferably from about 8 phr to about 25 phr. Water-based emulsions of the polymers may be combined over about 15–30 minutes at ambient temperature. When preparing the PPAE in a direct process, the reaction mixture containing the polymer having pendant acetoacetoxy groups may need to be cooled before adding the poly(alkylenimine).

The Acetoacetoxy-functional Polymer

Any vinyl polymer having pendant acetoacetoxy groups or their derivatives may be used as the acetoacetoxy-functional polymer in the water-based latex of the invention. Polymers having pendant acetoacetoxy groups have been described, for example, in U.S. Pat. No. 4,987,186; U.S. Pat. No. 4,908,403; European Patent Application No. 0 573 142 A1; European patent Application No. 0 483 915 A1; and in Del Rector, et al., "Applications for the Acetoacetoxy Functionality in Thermoset Coatings", presented at the Water-Borne and Higher Solids Coatings Symposium, Feb. 3–5, 1988, New Orleans, La. These documents are incorporated here by reference.

The polymers having pendant acetoacetoxy groups or derivatives of acetoacetoxy groups may be prepared using emulsion polymerization techniques known in the art, such as described above. Generally, the acetoacetoxy-functional polymer is prepared by emulsion polymerization of acetoacetoxy monomers such as Formula I above with other vinyl monomers. These polymers may contain both acid- and non-acid vinyl monomers. See U.S. Pat. No. 4,987,186; U.S. Pat. No. 4,908,403; European Patent No. Application No. 0 573 142 A1; European patent Application No. 0 483 915 A1; and Del Rector, et al., supra. Preferred acetoacetoxy-functional monomers and non-acid vinyl monomers are the same as those discussed above in regards to the SAAP. The acetoacetoxy-functional polymer need not incorporate a surface-active vinyl monomer, but in a preferred embodiment may be the SAAP used to prepare the PPAE. More preferably, the emulsion polymerization used to prepare the acetoacetoxy-functional polymer is carried out in the presence of a nonionic surfactant and an anionic surfactant as described above for the SAAP.

The acetoacetoxy-functional polymer should contain sufficient acetoacetoxy-functionality to allow it to react and cross-link with the amino-functional polymer, preferably the PPAE, upon film formation. The acetoacetoxy-functional polymer may, for example, generally contain from about 1 weight percent to about 40 weight percent of acetoacetoxy-functional monomers and about 60 to about 99 weight percent of other vinyl monomers. The amount of acetoacetoxy-functional monomers may vary outside this range depending on the degree of cure necessary for a particular application. Conventional coatings usually contain between 2 to 25 weight percent acetoacetoxy-functional monomers, which is a preferred range for an acetoacetoxy-functional polymer used in the present invention. The acetoacetoxy-functional polymer may be a high or low molecular weight polymer with an average molecular weight ranging, for example, from about 1000 to over 1 million. Lower molecular weight polymers should contain more acetoacetoxy-functional monomers to assure sufficient crosslinking with the amino-functional polymer upon film formation and cure.

The acetoacetoxy functionality in the acetoacetoxy-functional polymer may be present as free acetoacetoxy groups or as derivatives of those groups such as, for example, an enamine group or acetoacetamide group. The acetoacetoxy-functional polymer may contain both free acetoacetoxy groups and acetoacetoxy derivatives. When the acetoacetoxy-functional polymers contains acetoacetoxy derivatives, the polymer should be capable of crosslinking with the amino-functional polymer upon film formation. This crosslinking may occur through acetoacetoxy groups or the derivative groups.

Enamine-functional polymers represent a preferred derivative of polymers having pendant acetoacetoxy groups. Enamine-functional polymers may be used as the acetoacetoxy-functional polymer in the water-based latex of the invention. In water-based latexes, the enamine functionality serves to stabilize the acetoacetoxy- groups and protect them from hydrolysis. Enamine-functional polymers have been described in Moszner et al., Polymer Bulletin 32, 419–426 (1994); European patent Application No. 0 492 847 A2; U.S. Pat. No. 5,296,530; and U.S. Pat. No. 5,484,849. These documents are incorporated here by reference.

Enamine-functional polymers may be prepared by reacting a polymer having acetoacetoxy groups is reacted with ammonia or a primary or secondary amine. This preparation of enamine-functional vinyl polymers having pendant enamine groups is described in U.S. Pat. No. 5,484,849. Typically, the reaction stoichiometry uses at least one molar equivalent of amino (NH) groups to acetoacetoxy groups. Though the reaction is rapid, an equilibrium exists between the enamine product and the acetoacetoxy/NH reactants. The rate of enamine formation increases with temperature. Due to the equilibrium, however, an enamine-functional polymer may have both enamine and acetoacetoxy groups.

Enamine-functional polymers or copolymers may also be prepared by polymerization of enamine-functional monomers. This method of preparation is described Moszner et al., Polymer Bulletin 32,419–426 (1994).

Enamine-functional polymers also having allyl functionalities are described in U.S. Pat. No. 5,539,073 which is incorporated here by reference. During emulsion polymerization, allyl functionality may be incorporated into the particles using, for example, allyl methacrylate and acetoacetoxy and/or enamine functionality may be incorporated using, for example, acetoacetetoxy methacrylate. Waterborne allyl- functional polymer particles form coatings which cure slowly at room temperature. Coatings formed from a blend of acetoacetoxy-functional particles, such as enamine- functional polymers, with amino-functional polymer particles, according to the invention, cure rapidly to form crosslinks. However, unwanted side reactions may produce coatings which are yellowed. Waterborne polymer particles having allyl functionality and acetoacetoxy and/or enamine functionality produce coatings which have little or no yellowing than coatings of comparable crosslinked density produced from enamine-based particles alone. According to the invention, waterborne polymer particles which contain allyl and enamine and/or acetoacetoxy functionality can be blended with waterborne amino-functional polymer particles to produce coatings which cure faster than coatings prepared from allyl-based waterborne particles. In addition, this combination of crosslinking chemistry provides coatings with less yellowing than cured coatings prepared from a blend of enamine-based and/or acetoacetoxy-functional polymer particles and amino-functional polymer particles.

Water-based Latexes of the Invention

In a water-based latex of the invention, the amino-functional polymer particles, (preferably PPAE particles) may be present from about 5 to about 50 weight percent based on dry resin and more preferably from about 10 to about 25 weight percent. The acetoacetoxy-functional polymer may be present from about 50 to about 95 weight percent based on dry resin. The acetoacetoxy-functional polymer is, more preferably, present from about 75 to about 90 weight percent based on dry resin.

The examples below illustrate the preparation of a water-based latex according to the invention. In general, the latex of the invention may be prepared by mixing aqueous latexes of the amino-functional polymer particles and of the acetoacetoxy-functional polymer particles. Accordingly, a water-based latex of the invention may be a "one pack" pre-mixed latex or a "two pack" for mixing prior to use. Due to the advantageous stability of a water-based latex of the invention containing the amino-functional polymer particles and of the acetoacetoxy-functional polymer particles, "one pack" latexes are preferred. The surfactants discussed above are preferably components of those latexes, providing stability prior to and after mixing. A latex of the invention may also contain other additives known in latex compositions and may use other emulsion polymerization or blending methodology such as disclosed in U.S. Pat. No. 5,371,148, incorporated here by reference.

A preferred embodiment of the invention relates to a latex containing dispersed, waterborne amino-functional polymer particles, (preferably PPAE particles); dispersed, waterborne acetoacetoxy-functional polymer particles; and a buffer, particularly an ammonium-based buffer. The pH of a water-based latex of the invention may be adjusted and/or buffered using, for example, sodium bicarbonate, ammonium bicarbonate, ammonium dihydrogenphosphate, an ammonium salt of a poly(meth)acrylate, or a mixture of such buffers. The buffering compound, such as ammonium bicarbonate, may be added to an aqueous dispersion of either amino-functional polymer particles or acetoacetoxy-functional polymer particles prior to mixing or to the final latex. Preferably the buffer is added to the final blended latex.

When an ammonium buffer is used, an equilibrium exits between the ammonium ion and amine groups on the amino-functional polymer particles. This equilibrium provides free ammonia to the latex which may react with the acetoacetoxy groups on the acetoacetoxy-functional polymer to form enamine groups. Not only does this provide stability to the acetoacetoxy-functional polymer, but it also may lower and buffer the pH of the overall latex. Latexes having pH values in the range of about 7.0 to 9.2, preferably about 8.4 to 9.2, may be achieved using ammonium buffers. Moreover, the buffered latexes of the invention possess increased stability (shelf life) at elevated temperatures and for long periods of time.

The water-based latexes of the invention are useful in a variety of coating compositions such as architectural coatings, maintenance coatings, industrial coatings, automotive coatings, textile coatings, inks, adhesives, and coatings for paper, wood, and plastics. Accordingly, the present invention relates to such coating composition containing a water-based latex of the invention. The latexes of the invention may be incorporated in those coating compositions in the same manner as known polymer latexes and used with the conventional components and or additives of such compositions. The coating compositions may be clear or pigmented. With their crosslinking ability, adhesion properties, and resistance properties, the water-based latexes of the invention impart new and/or improved properties to the various coating compositions.

Upon formulation, a coating composition containing a water-based latex of the invention may then be applied to a variety of surfaces, substrates, or articles, e.g., paper, plastic, steel, aluminum, wood, gypsum board, or galvanized sheeting (either primed or unprimed). The type of surface, substrate, or article to be coated generally determines the type of coating composition used. The coating composition may applied using means known in the art. For example, a coating composition may be applied by spraying or by coating a substrate. In general, the coating may be dried by heating but preferably is allowed to air dry. Advantageously, a coating employing a water-based latex of the invention may be thermally or ambiently cured. As a further aspect, the present invention relates to a shaped or formed article which has been coated with a coating compositions of the present invention.

A coating composition according to the invention may comprise a water-based latex of the invention, water, a solvent, a pigment (organic or inorganic) and/or other additives and fillers known in the art. When a solvent is used, water-miscible solvents are preferred.

For example, a latex paint composition of the invention may comprise a water- based latex of the invention, a pigment and one or more additives or fillers used in latex paints. Such additives or fillers include, but are not limited to, leveling, rheology, and flow control agents such as silicones, fluorocarbons, urethanes, or cellulosics; extenders; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; curing agents; or coalescing agents. Specific examples of such additives can be found in *Raw Materials Index*, published by the National Paint & Coatings Association, 1500 Rhode Island Avenue, NW, Washington, D.C. 20005.

A water-based latex of the present invention can be utilized alone or in conjunction with other conventional waterborne polymers. Such polymers include, but are not limited to, water dispersible polymers such as consisting of polyesters, polyester-amides, cellulose esters, alkyds, polyurethanes, epoxy resins, polyamides, acrylics, vinyl polymers, styrene-butadiene polymers, vinylacetate-ethylene copolymers, and the like.

Used in combination with certain other water-dispersible polymers, the water-based latexes of the invention bring a unique advantage to the final composition, in addition to their crosslinking ability, adhesion properties, and resistance properties. The PPAE, when present as a preferred amino-functional polymer, has the ability to scavenge residual $\alpha,\beta$-unsaturated, carbonyl- or electron withdrawing group-containing monomer remaining in the polymer latex. In other words, the PPAE scavenges, through a Michael-addition reaction, residual monomers such as $\alpha,\beta$-unsaturated acids, $\alpha,\beta$-unsaturated esters, $\alpha,\beta$-unsaturated amides, and $\alpha,\beta$-unsaturated nitrites. Removing these monomers can, not only eliminate the odors associated with them, but also improve health and safety when using the composition.

The following examples are intended to illustrate, not limit, the invention. The examples of various coating compositions of the invention use the following materials not described above:

LUPASOL G35 poly(ethylenimine), MW 2000, sold by BASF as a 50% solution in water.

TAMOL 1124 dispersant sold by RoHm & Haas Company.

RHOPLEX RM-2020 associative thickener sold by Rohm & Haas Company.

RM-5 and SCT 275 rheology modifiers (thickeners) sold by Rohm & Haas Company.

FOAMASTER AP and FOAMASTER VF defoamers sold by Henkel.

TI-PURE R-900 titanium dioxide pigment sold by Dupont.

TRITON CF-10 surfactant sold by Union Carbide.

CELLOSIZE 4400H rheology modifier sold by Union Carbide.

AQUACAT (Allkylaryl ethoxylate of Cobalt; 5% active cobalt metal, 72% Solids) sold by ULTRA additives, Inc., Paterson, N.J.

HYDROCURE II (Cobalt neodecanoate, 45% solids), sold by Mooney Chemical, Inc., Cleveland, Ohio.

FC-430 Fluoro surfactant, (98.5% solids), sold by 3M, St. Paul, Minn.

PROXEL GXL preservative, sold by Zeneca.

IGEPAL CO-630 surfactant, sold by Rhone-Poulenc.

DREWPLUS L-493 defoamer, sold by Drew Chemical.

TEXANOL coalescing solvent, sold by Eastman Chemical Company.

EASTMAN DM AND EASTMAN EB coalescing solvents, sold by Eastman Chemical Company.

POLYPHOBE 102 thickener, sold by Union Carbide.

DISPERSE-AYD W-22 dispersant, sold by Daniel Products.

SURPYNOL 104 and 104DPM products (50% Solids), sold by Air Products and Chemicals, Inc., Allentown, Pa.

SURFYNOL 420, sold by Air Products and Chemicals, Inc., Allentown, Pa.

RHEOVIS CR2 thickener sold by Allied Colloids, Suffolk, Va.

t-butylhydroperoxide was used as a 70% solution in water.

The following methods were used to evaluate the coatings and films prepared according to the invention.

Latex Gel Fraction/Swell Ratio

Latex gel fraction (LGF) is obtained by determining the insoluble weight fraction of polymer in a latex sample. Latex swell ratio (LSR) is obtained by determining the ratio of the insoluble polymer weight fraction swollen in the selected solvent (by weight) to dry weight of the insoluble weight fraction in a latex sample. Average values are determined from triplicate or quadruplicate measurements with acetone as the solvent.

The procedure used is as follows. For each sample determination, a centrifuge tube is baked in a vacuum oven at 120° C. for 90 minutes, cooled in a desiccator of $P_2O_5$ and weighed (W1). Enough latex is added to the conditioned tube to make approximately a 1% solution when solvent is added and the latex weight is recorded (W2). Solvent is added to the tube until the tube is approximately three fourths fill and the solution is allowed to sit overnight. The next day, the sample is centrifuged at 75,530 rpm for 30 minutes. The clear liquid portion in the tube is removed. The remaining polymer gel is washed with additional solvent. The centrifuge and washing step is repeated twice more. Finally, the clear liquid portion is removed and the tube containing the wet gel is weighed (W3). The tube containing the wet gel is baked overnight in a forced air oven at 80° C. and then baked in a vacuum oven at 120° C. for 3 hours and cooled in a desiccator over $P_2O_5$. The tube plus dry solids is weighed and the vacuum portion of the baking procedure is repeated until reproducible weights are obtained (W4). Calculations were made according to the following equations:

$$LGF = (W4-W1)/(W2*TS)$$

$$LSR = (W3-W1)/(W4-W1)$$

where TS=total weight fraction solids of the latex.

Constant Temperature and Humidity Room

Films were prepared and film measurements were conducted in a constant temperature and humidity (CTH) room at ASTM standard conditions for laboratory testing of 73.5±3.5° F. (23±2° C.) and 50±5% relative humidity.

Resistant Minimum Film Forming Temperature

Resistant minimum film forming temperature (MFFT resist) is determined by casting a wet latex film with a 4-mil applicator cube on an MFFT bar set at a temperature range in which the film will coalesce during drying, pulling the edge of a brass spatula blade through the film from cold to hot end on the MFFT bar after 30 minutes, and recording the temperature at which the blade offers significant resistance to the experimenter.

Tensile

Tensile tests are performed in the CTH room on a on a United Tensile Tester Model STM-1-PC, which is a constant rate of elongation machine. Film samples are obtained by casting the sample on release paper with a 7 mil bird bar, drying the film for the desired time at the stated conditions, and cutting a dogbone-shaped thin-film sample with a 1" wide die. The film is measured for film thickness, mounted in the tensile tester grips and tested at a crosshead speed of 1"/minute using a 5 lb-force load cell. Ten samples are run and the five samples with the greater breaking stress are averaged for all tensile values reported according to ASTM D2370.

Glass Transition

Onset and midpoint temperatures were determined on film samples using a differential scanning calorimeter (DSC) in a nitrogen atmosphere at a heating rate of 20° C./min. values quoted are from the reheat curve.

Film Gel Fraction (FGF) and Film Swell Ratio (FSR)

Film gel fraction (FGF) is obtained by determining the insoluble weight fraction of polymer in a dry film sample. Film swell ratio (FSR) is obtained by determining the ratio of ratio of the insoluble polymer weight fraction swollen in the selected solvent (by weight) to dry weight of the insoluble weight fraction in a dry film sample. Average values are determined from quadruplicate measurements with acetone as the solvent.

The procedure used was as follows: for each sample determination, a 4"×4" 325-mesh steel screen and a metal weighing boat are baked in a vacuum oven at 120° C. for 90 minutes, cooled 30 minutes over $P_2O_5$ and weighed (W1 and W2, respectively). After the latex film is dried the required number of days under constant temperature and humidity or baked in the oven at the specified time and temperature, a piece of the film is cut, weighed (W3), placed in the aluminum pan, and put aside. Another film sample is cut, weighed (W4), and placed in a screw cap jar with excess solvent on a shaker bath for 16 hours at constant temperature. The film gel is recovered by pouring the solution plus wet solids from the jar through the screen and then weighing the screen plus retained wet solids (W5). At this point, the screen plus solids and the film sample in the aluminum boat are dried in a forced air oven at 80° C. overnight and then in a vacuum oven at 120° C. for 3 hours and cooled for 30 minutes in a desiccator over $P_2O_5$. The samples are weighed and the vacuum portion of the baking procedure is repeated until reproducible weights are obtained for the screen plus dry solids (W6) and the film sample in the aluminum boat (W7).

Calculations were made by the equations shown below $$FGF = (W6-W1)/[(W4)*[(W7-W2)/W3]]$$

$$FSR = (W5-W1)/(W6-W1)$$

Yellowness Index

Seven mil wet emulsion films are cast on polyester sheets. The coated polyester sheet and an uncoated control polyester sheet are allowed to dry under the specified conditions. Yellowness index is measured of both the clear emulsion film and the control panel placed on top of a white control panel using a colorimeter in the L,a,b mode.

Color

Seven mil wet emulsion films are cast on polyester sheets. The coated polyester sheet and an uncoated control polyester sheet are allowed to dry under the specified conditions. Color is measured of both the clear emulsion film and the control panel placed on top of a white control panel using a calorimeter in the L,a,b mode.

Methyl Ethyl Ketone Resistance

Films dried at specified conditions were constantly soaked with methyl ethyl ketone (NEK). Data was obtained using a crockmeter with a 1 kg weight placed on the arm for a total weight of approximately 1500 g. The test ended when the break-through of the film on the panel was first observed. Data were reported as MEK double rubs (one set of back and forth). All data are an average of three results. Paint Viscosity:

Paint viscosity (in Krebs Units) was measured after 24 hours using a Krebs-Stormer viscometer.

Gloss

Gloss was measured on 6 mil (wet) thick films cast on Leneta 2 B opacity paper after 24 hours using a micro-tri-glossmeter by BYK-Gardner according to ASTM method D 523 Test Method for Specular Gloss.

Blocking Resistance

Blocking resistance was determined using 6 mil (wet) films on Leneta 2B opacity paper according to ASTM 4946 Test Method for Blocking Resistance of Architectural Paints using 1 psi pressure after film dried to designated times. Heated block resistance was determined in a forced air oven at 120° F. with the painted surfaces face-to-face under I psi pressure for 30 minutes. The tests were numerically rated where a rating of 1 represents 100% pass where painted surfaces lift apart with no noise, a rating of 2 represents noise when painted surfaces are separated but no film degradation occurs, a rating of 3 represents some destruction of the painted surfaces when the two surfaces are separated and a rating of 4 represents 100% fail where the painted surfaces flow completely together and complete destruction of the films occurs upon separation.

Print Resistance

Print resistance was determined using 6 mil (wet) films on Leneta 2B opacity paper according to ASTM D 2064 - 91 Test Method for Print Resistance of Architectural Paints using a 4 psi pressure placed on top of a #6 black rubber stopper which was placed on four layers of cheesecloth after film dried to designated times. Heated print resistance was determined in a forced air oven at 120° F. with folded cheesecloth (as above) under 4 psi pressure for 30 minutes. The tests were numerically rated where a rating of 1 represents 100% pass with no demarcation (cloth lifts off with no print left behind), a rating of 2 represents demarcations (some impression is observed), a rating of 3 represents 100% fail (the cheesecloth impregnates the film).

Scrub Resistance

Scrub resistance was determined following ASTM D2486 Test Method for scrub resistance of architectural coatings.

The coating is applied at 7 mil wet on Scrub Test Charts Form P121-10 ON and allowed to dry for the specified period of time. The panel is placed in a Gardco Scrub Machine, Model D-10 V, 10 g of Standardized Scrub Medium (abrasive type) for ASTM D2486 and D3450 is placed on the scrub brush, the panel is wet with 5 ml DI water, the test machine counter is zeroed, and the test is run at the maximum test speed on the machine. After each 400 cycles before failure, the brush is removed and 10 more g of scrub medium is added evenly on the bristles, the brush is replaced, 5 ml of DI water is placed on the panel and the test is continued. The test is stopped at 1000 cycles or failure, whichever comes first. Failure is defined as the number of cycles to remove the paint film fully in on continuous line across the width of the shim.

Wet Adhesion Test

This procedure tests the coatings adhesion to an aged, alkyd substrate under wet, scrubbing conditions. This procedure is described in "VYNATE™ (Union Carbide Chemicals and Plastics Corporation)—Vinyl Emulsion Vehicles for Semigloss Interior Architectural Coatings", M. J. Collins, et al., presented at the 19th Annual "Water-Borne High-Solids and Powder Coating Symposium", Feb. 26–28, 1992, New Orleans, La., USA A ten-mil drawdown of a commercial gloss alkyd paint is made on a "Leneta" scrub panel (adhesion varies from alkyd to alkyd—a Glidden Industrial Enamel was used.) The alkyd film is allowed to age one week at ambient conditions, then baked at 110° F. for 24 hours, and then aged at least one more week at ambient conditions. A seven-mil drawdown of the test paint is then made over the aged alkyd and allowed to air dry three days. (In order to differentiate between samples that pass this test, dry times may be shortened. Seven days is a common period, and occasionally 5 hours dry time is used. Constant temperature/humidity conditions, 72° F./50%, are normally used for drying.) The test paint is then cross-hatched with a razor and submerged in water for 30 minutes. The paint film is inspected for blistering and scratched with the fingernail to gauge the adhesion. While still wet, the panel is placed on a "Gardner" scrub machine. Ten ml of five percent "LAVA™" soap slurry are added, and the Nylon scrub brush (WG 2000NB) is passed over the scored paint film area. Water is added as needed to keep the paint film wet (flooded). The number of brushing cycles for initial peel and ten percent peel are noted. The number of cycles for complete removal of the film is often noted also.

Low Temperature Coalescence and Mudcracking

Low temperature coalescence (LTC) was determined using one 7 mil (wet) paint film on Leneta 2B opacity paper which was allowed to dry for 24 hours in a room kept at 40° F. and 50% relative humidity and another 7 mil (wet) paint film on Leneta 2B opacity paper which was allowed to dry for 24 hours in a room kept at 70° F. and 50% relative humidity. The yellowness index (YI) was determined on each dry coating using a calorimeter in the L,a,b mode before and after staining the paint for 5 minutes with a 7 mil (wet) of K-and-N Special Test Compound. The test compound was removed by washing with a camel hair brush wetted with mineral spirits. The panel was hung vertically to air dry for at least 3 hours. The change in YI (delta YI) for each paint sample was calculated and low temperature coalescence was assigned a value based on the difference between the change in YI for the 70° F. and the 40° F. coating. Mudcracking was labeled "Yes" if the coating which was dried at 40° F. and 50% relative humidity developed cracks and the delta YI for the sample could not be determined.

Stain Resistance

Stain resistance was determined using 6 mil (wet) paint films on Leneta 7B sag and level test paper which were allowed to dry for 21 days in the CTH room. Thirteen stains were applied to the dried coating film in approximately one inch diameter drops and then removed with a sponge wetted with an aqueous solution of dish detergent after various amounts of exposure time. The coating was exposed to black shoe polish, catsup, Top Job™, crayon, grape juice, red Kool Aid™, and Pine Sol™ covered with a watch glass for 5 hours before removal, mustard, coffee and nigrosine covered with a watch glass for 30 minutes before removal, red ink and black ink for 5 minutes before removal and iodine for 30 seconds before removal. Each stain was given a numerical rating from one to five, with one representing no stain left, two equal to a slight stain, three equal to a moderate stain, four equal to a strong stain and five equal to a severe stain. The thirteen ratings were added and a cumulative value for stain reported.

EXAMPLE 1

Preparation of Large Core/Shell Enamine-Containing Waterborne Polymer Latex

To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, 44.24 g of methyl methacrylate, 8.26 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 171 g of water, 12.79 g of AEROSOL 18, 5.09 g of TERGITOL NP40 (70%), 180.88 g of styrene, 90.0 g of 2-ethylhexyl acrylate, 143.92g of acetoacetoxyethyl methacrylate, and 1.68g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and 45 g of ammonium hydroxide (28%) were pumped in over 15 minutes. The latex was then filtered through 100 mesh wire screen. Solids level, 46.0; pH, 8.4; amount of dried material (100 mesh screen), 11.6 g; particle size (Dw), 236 nm, ZETA potential, −47.1 mv, latex gel fraction/swell ratio 42/9.6. Infrared analysis of clear films cast over ZnSe showed an absorption at 1565 cm$^{-1}$ which represents an enamine moiety.

EXAMPLE 2

Preparation of Large Core/Shell PEI-Containing Waterborne Polymer Latex (Mole ratio of N-H group to acetoacetoxy group was 4.27.)

The procedure for the preparation of this latex was similar to the latex preparation described in Example 1 except that 247.35 g of poly(ethylenimine) (50% in water) was added in place of the ammonium hydroxide solution. Mole ratio of N-H group to acetoacetoxy group was 4.27. The latex was then filtered through 100 mesh wire screen. Solids level, 46.8; pH, 10; amount of dried material (100 mesh screen), 3.28 g; particle size (Dw), 225 nm, ZETA potential, −23.7 mv (pH =11.7), latex gel fraction/swell ratio 75/6.1. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly (ethylenimine) with the pendant acetoacetoxy group, the latex was centrifuged and the water phase analyzed. Elemental analysis of the water phase showed at most 2% of the poly(ethylenimine) remained in the water phase.

EXAMPLE 3

Preparation of Large Core/Shell PEI-Containing Waterborne Polymer Latex (Mole ratio of N-H group to acetoacetoxy group was 5.47.)

The procedure for the preparation of this latex was similar to the latex preparation described in Example 1 except that 316.86 g of poly(ethylenimine) (50% in water) was added in place of the ammonium hydroxide solution. Mole ratio of N-H group to acetoacetoxy group was 5.47. The latex was then filtered through 100 mesh wire screen. Solids level, 46.5; pH, 10; amount of dried material (100 mesh screen), 4.11 g; particle size (Dw), 225 mn, latex gel fraction/swell ratio 76/5.7. Infrared analysis of clear films cast over ZnSe showed an absorption at 1653 cm$^{-1}$ and 1565 cm$^{-1}$ and a disappearance of the absorbencies at 1631 cm$^{-1}$and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed at most 2% of the poly(ethylenimine) remained in the water phase.

EXAMPLE 4

Preparation of Small Core/Shell Enamine-Containing Waterborne Polymer Latex

To a 3000 mL resin kettle equipped with a condenser, nitrogen purge, and subsurface feed tube were added 1100 g of water, 49.0 g of HITENOL HS-20, 8.05 g of TERGITOL NP-40(70%), 7.3 g of sodium carbonate, 44.24 g of methyl methacrylate, 8.26 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 273.5 g of water, 19.65 g of AEROSOL 18, 20.19 g of TERGITOL NP-40 (70%), 271.78 g of methyl methacrylate, 50.72 g of styrene, 350.63 g of 2-ethylhexyl acrylate, and 1.55 g of tetraethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 147 g of water, 12.15 g of AEROSOL 18, 12.5 g of TERGITOL NP-40 (70%), 180.88 g of styrene, 90.0 g of 2-ethylhexyl acrylate, 143.92g of acetoacetoxyethyl methacrylate, and 1.68g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and 45 g of ammonium hydroxide (28%) were pumped in over 15 minutes. The latex was then filtered through 100 mesh wire screen. Solids level, 41.0; amount of dried material (100 mesh screen), 4.8 g; particle size (Dw), 65 nm, latex gel fraction/swell ratio 57/11.6. Infrared analysis of clear films cast over ZnSe showed an absorption at 1565 cm$^{-1}$ which represents an enamine moiety.

EXAMPLE 5

Preparation of Small Core/Shell PEI-Containing Waterborne Polymer Latex (Mole ratio of N-H group to acetoacetoxy group was 4.27.)

The procedure for the preparation of this latex was similar to the latex preparation described in Example 1 except that 247.35 g of poly(ethylenimine) (50% in water) was added in place of the ammonium hydroxide solution. Mole ratio of N-H group to acetoacetoxy group was 4.27. The latex was then filtered through 100 mesh wire screen. Solids level, 41.6; pH, 10; amount of dried material (100 mesh screen), 3.03 g; particle size (Dw), 58 nm, latex gel fraction/swell ratio 62/5.6. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed at most 2% of the poly(ethylenimine) remained in the water phase.

EXAMPLE 6

Preparation of Small Core/Shell PEI-Containing Waterborne Polymer Latex (Mole ratio of N-H group to acetoacetoxy group was 5.43.)

The procedure for the preparation of this latex was similar to the latex preparation described in Example 1 except that 314.45g of poly(ethylenimine) (50% in water) was added in place of the ammonium hydroxide solution. Mole ratio of N-H group to acetoacetoxy group was 4.27. The latex was then filtered through 100 mesh wire screen. Solids level, 41.6; pH, 10; amount of dried material (100 mesh screen), 3.03 g; particle size (Dw), 70 nm, latex gel fraction/swell ratio 61/6.5. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed.

Elemental analysis of the water phase showed at most 2% of the poly(ethylenimine) remained in the water phase.

EXAMPLE 7

Preparation of Large Core/Shell PEI-Containing Waterborne Polymer Latex (Mole ratio of N-H group to acetoacetoxy group was 2.12.)

To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, 55.23 g of methyl methacrylate, 4.03 g of styrene, 47.40 g of 2-ethylhexyl acrylate, 20.15g of acetoacetoxyethyl methacrylate, and 0.336 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.5.36 g/min. After the first emulsion feed was completed, a second emulsion feed composed of 171 g of water, 12.79 g of AEROSOL 18, 5.09 g of TERGITOL NP-40 (70%), 211.03 g of styrene, 80.0 g of 2-ethylhexyl acrylate, 123.77g of acetoacetoxyethyl methacrylate, and 1.68g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and filtered through 100 mesh wire screen. Solids level, 46.64; pH, 8.2; amount of dried material (100 mesh screen), 24.65 g; Particle Size, (Electron Microscopy), 450 nm. To 2500 g of this latex were added over 15 minutes 115 g of poly(ethylenimine) (50%). Solids, 46.6%; pH, 10.4; Particle Size (Electron Microscopy), 450 nm. Infrared analysis of clear films cast over ZnSe showed an absorption at 1653 $cm^{-1}$ and 1565 $cm^{-1}$ and a disappearance of the absorbencies at 1631 $cm^{-1}$ and 1655 $cm^{-1}$ after addition of the poly(ethylenimine).

EXAMPLE 8

Evaluation of Films Prepared from Blending an Enamine-Containing and PEI-Containing Waterborne Polymer Latexes According to the Invention Blends were prepared by adding the appropriate weight fraction of PEI-containing latex to enamine-containing latex (dry resin on dry resin). Typically, to 100 g of enamine-containing latex (Example 1) were added the appropriated weighed amount of PEI-containing latex (33.42 g of Example 2) such that the weight fraction of PEI-containing latexes represented a weight fraction of 25% (dry resin on dry resin). All formulations were prepared in a similar manner with varying weight fractions of PEI-containing latex. After the blends were prepared, 1 phr of SURFONYL 104 DPM (1 g of active SURFONYL 104 DPM per 100 g of dried resin) was added as a wetting agent. Wet films were cast over aluminum chromate treated panels (0.025"×3"×9") then cured in a forced-air oven or allowed to cure at room temperature at a relative humidity of 50%. Dried film thicknesses were measured, and the solvent resistance determined by measuring the films resistance to methyl ethyl ketone double rubs. The results are reported in Tables 1 and 2 below and FIGS. 1–5. Tables 1 and 2 report the volume fraction of the PEI-containing latex (Vol Frac PEI Latex). The remaining volume fraction was made up by the enamine-containing latex.

TABLE 1

| Example | Example | Vol Frac (PEI Latex) | Dry Film Thickness, mils | Cure Temp 30 min | MEK Double Rub |
|---|---|---|---|---|---|
| 1 | 2 | 25 | 0.75/1.5 | 120° C. | 24/99 |
| 1 | 3 | 25 | 0.75/1.5 | 120° C. | 41/208 |
| 1 | 5 | 25 | 0.75/1.5 | 120° C. | 65/215 |
| 1 | 6 | 25 | 0.75/1.5 | 120° C. | 57/175 |
| 4 | 2 | 25 | 0.75/1.5 | 120° C. | 44/141 |
| 4 | 3 | 25 | 0.75/1.5 | 120° C. | 39/113 |
| 4 | 5 | 25 | 0.75/1.5 | 120° C. | 17/83 |
| 4 | 6 | 25 | 0.75/1.5 | 120° C. | 19/80 |
| 1 | 7 | 50 | 1.0 | 120° C. | 143 |

The first eight blends in Table 1 were analyzed by least squares analysis. The results are shown in FIGS. 1 and 2.

FIG. 1 depicts constant contour plots of methyl ethyl ketone double rubs as a function of ammonia-based enamine-containing latexes and dry film thickness. The PEI-containing latex was added at a volume fraction of 25% (dry resin on dry resin). The plots were constructed assuming a one to one stoichiometric level of NH to enamine. In the plots, X2=1 represents a large particle size PEI-containing latex whereas X2=−1 represents a small particle size PEI-containing latex. Films were cured at 120° C. for 30 minutes in a forced-air oven.

Figure 2:
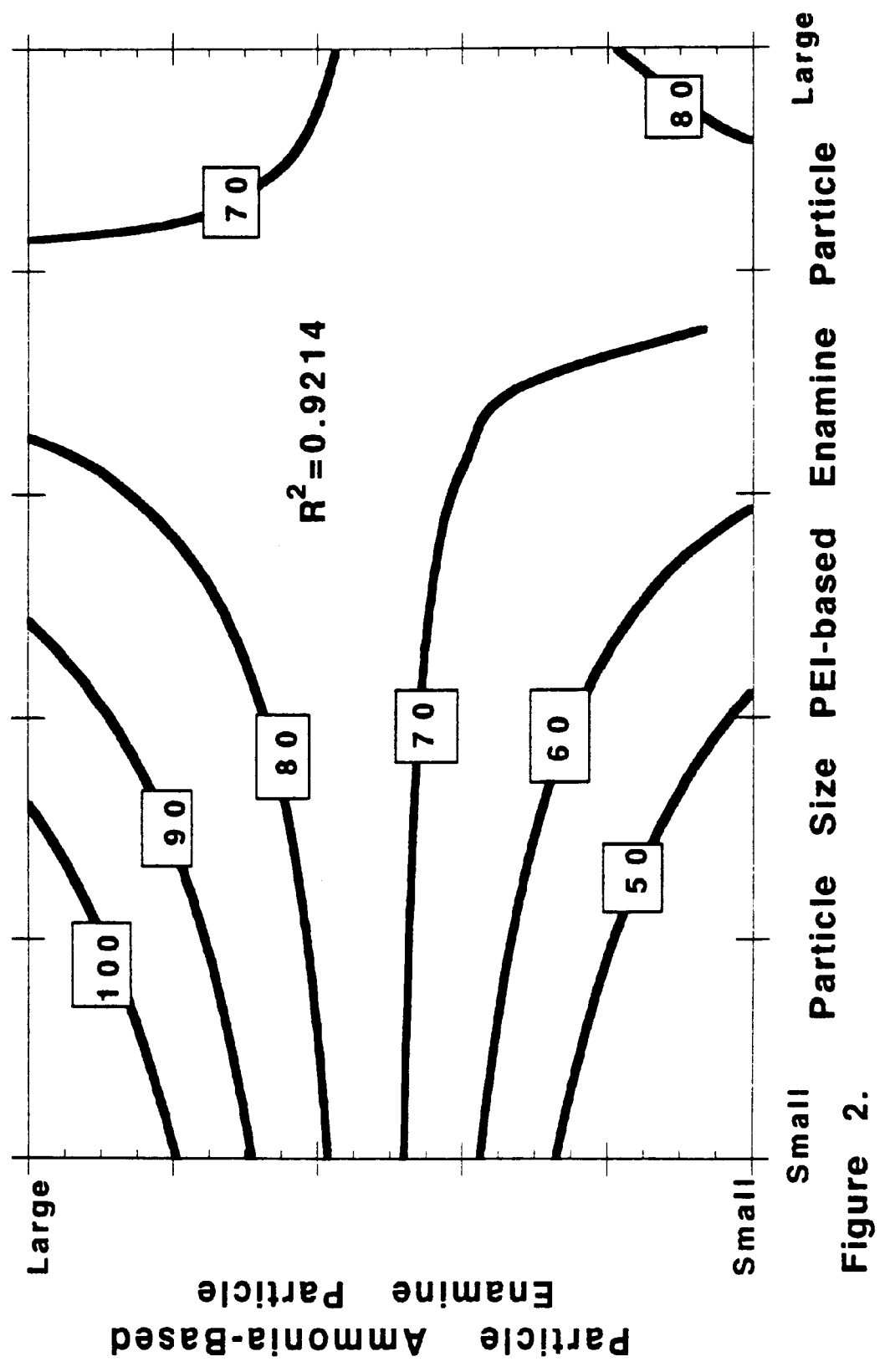

FIG. 2 depicts constant contour plots of methyl ethyl ketone double rubs as a function of latex particle size. The PEI-containing latex was added at a volume fraction of 25% (dry resin on dry resin). The plots were constructed assuming a one to one stoichiometric level of NH to enamine. Films were cured at 120° C. for 30 minutes in a forced-air oven. The dry film thickness was 1.0 mil.

TABLE 2

| Enamine Latex, Example | PEI Latex, Example | Vol Frac (PEI Latex) | Dry Film Thickness mils | Room Temp Cure, days | MEK Double Rub (1.0 mil/1.5 mil) |
|---|---|---|---|---|---|
| 1 | 2 | 25 | 1.0/1.5 | 2 | 41/81 |
| 1 | 3 | 25 | 1.0/1.5 | 2 | 35/69 |
| 1 | 5 | 25 | 1.0/1.5 | 2 | 51/101 |
| 1 | 6 | 25 | 1.0/1.5 | 2 | 36/73 |
| 4 | 2 | 25 | 1.0/1.5 | 2 | 75/177 |
| 4 | 3 | 25 | 1.0/1.5 | 2 | 33/52 |
| 4 | 5 | 25 | 1.0/1.5 | 2 | 31/63 |

TABLE 2-continued

| Enamine Latex, Example | PEI Latex, Example | Vol Frac (PEI Latex) | Dry Film Thickness mils | Room Temp Cure, days | MEK Double Rub (1.0 mil/1.5 mil) |
|---|---|---|---|---|---|
| 4 | 6 | 25 | 1.0/1.5 | 2 | 30/62 |
| 1 | 2 | 25 | 1.0/1.5 | 21 | 29/57 |
| 1 | 3 | 25 | 1.0/1.5 | 21 | 29/58 |
| 1 | 5 | 25 | 1.0/1.5 | 21 | 50/99 |
| 1 | 6 | 25 | 1.0/1.5 | 21 | 34/64 |
| 4 | 2 | 25 | 1.0/1.5 | 21 | 101/227 |
| 4 | 3 | 25 | 1.0/1.5 | 21 | 100/202 |
| 4 | 5 | 25 | 1.0/1.5 | 21 | 65/140 |
| 4 | 6 | 25 | 1.0/1.5 | 21 | 46/96 |

The blends in Table 2 were analyzed by least squares analysis. The results are shown in FIGS. 3, 4, and 5.

Figure 3:
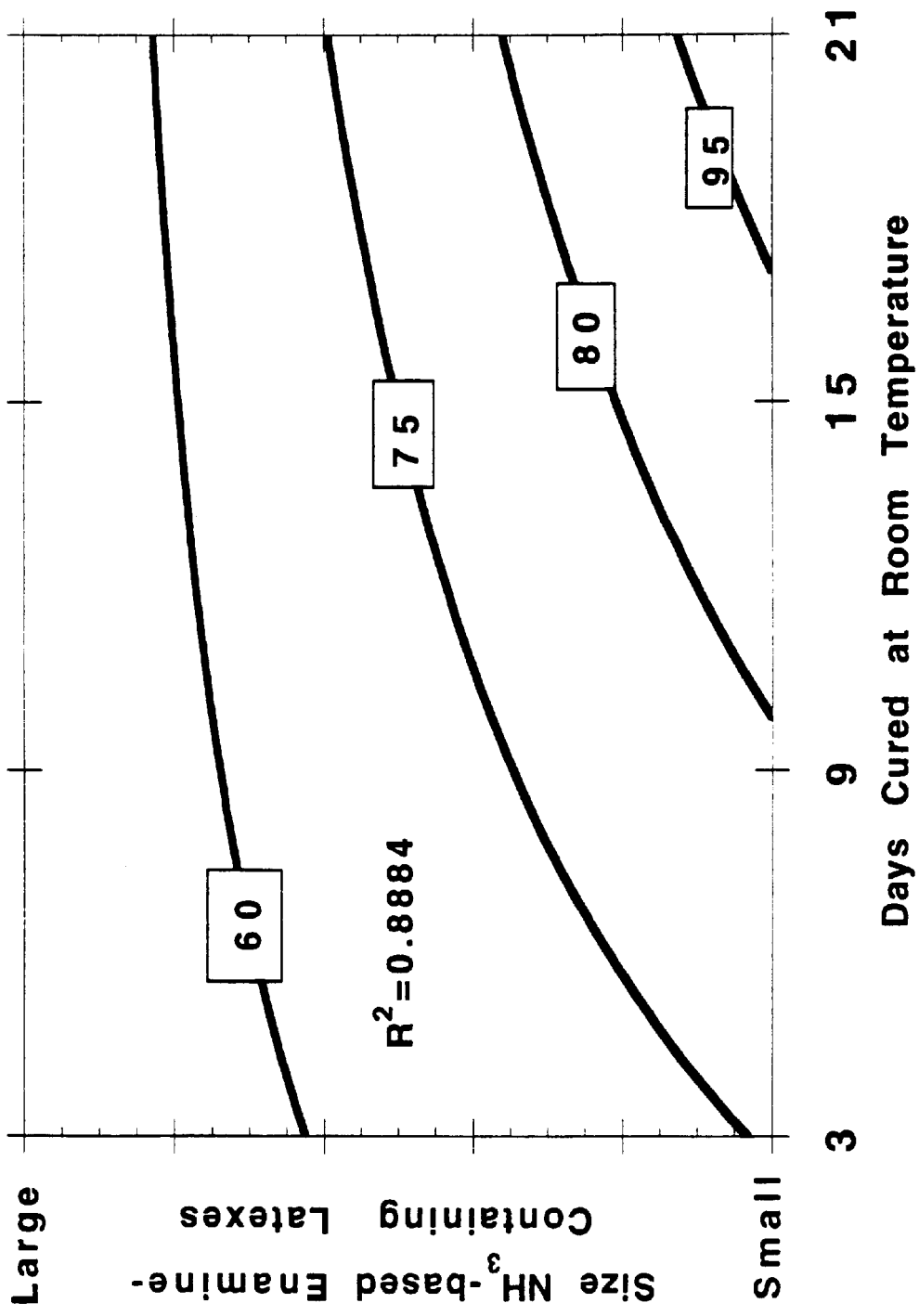
FIG. 3 depicts constant contour plots of methyl ethyl ketone double rubs as a function of the ammonia-based enamine-functional polymer latexes and number of days cured at 72° F. (room temperature) at 50% relative humidity.

FIG. 3 depicts constant contour plots of methyl ethyl ketone double rubs as a function of the ammonia-based enamine-containing latexes and days cured at 72° F. (room temperature) at 50% relative humidity. The PEI-containing latex was added at a volume fraction of 25% (dry resin on dry resin). The plots were constructed assuming a one to one stoichiometric level of NH to enamine. For the plots, a large particle size PEI-containing latex was used. The dry film thickness was 1.0 mil.

Figure 4:
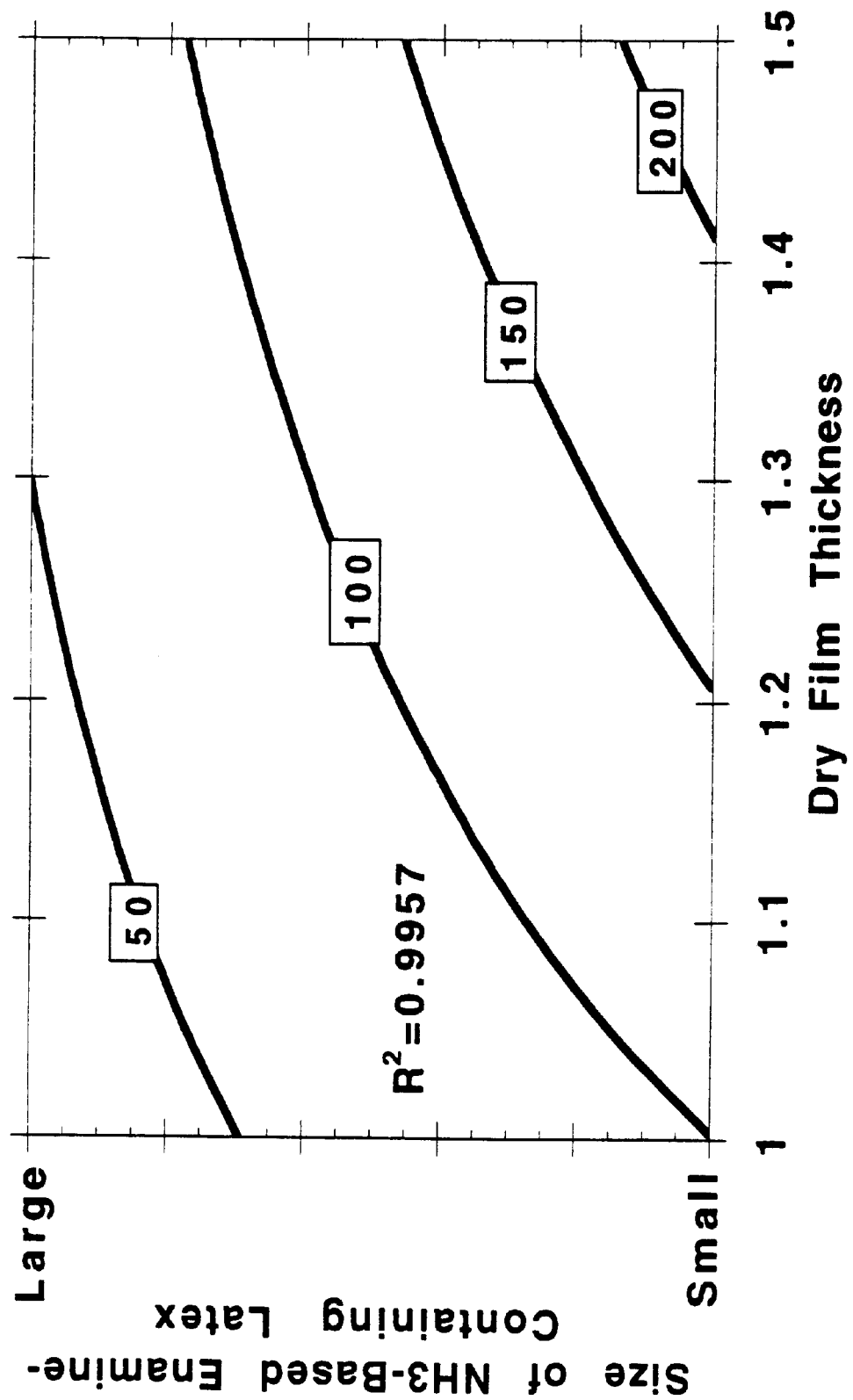
FIG. 4 depicts constant contour plots of methyl ethyl ketone double rubs as a function of the ammonia-based enamine-functional polymer latexes and dry film thickness.
Figure 5:
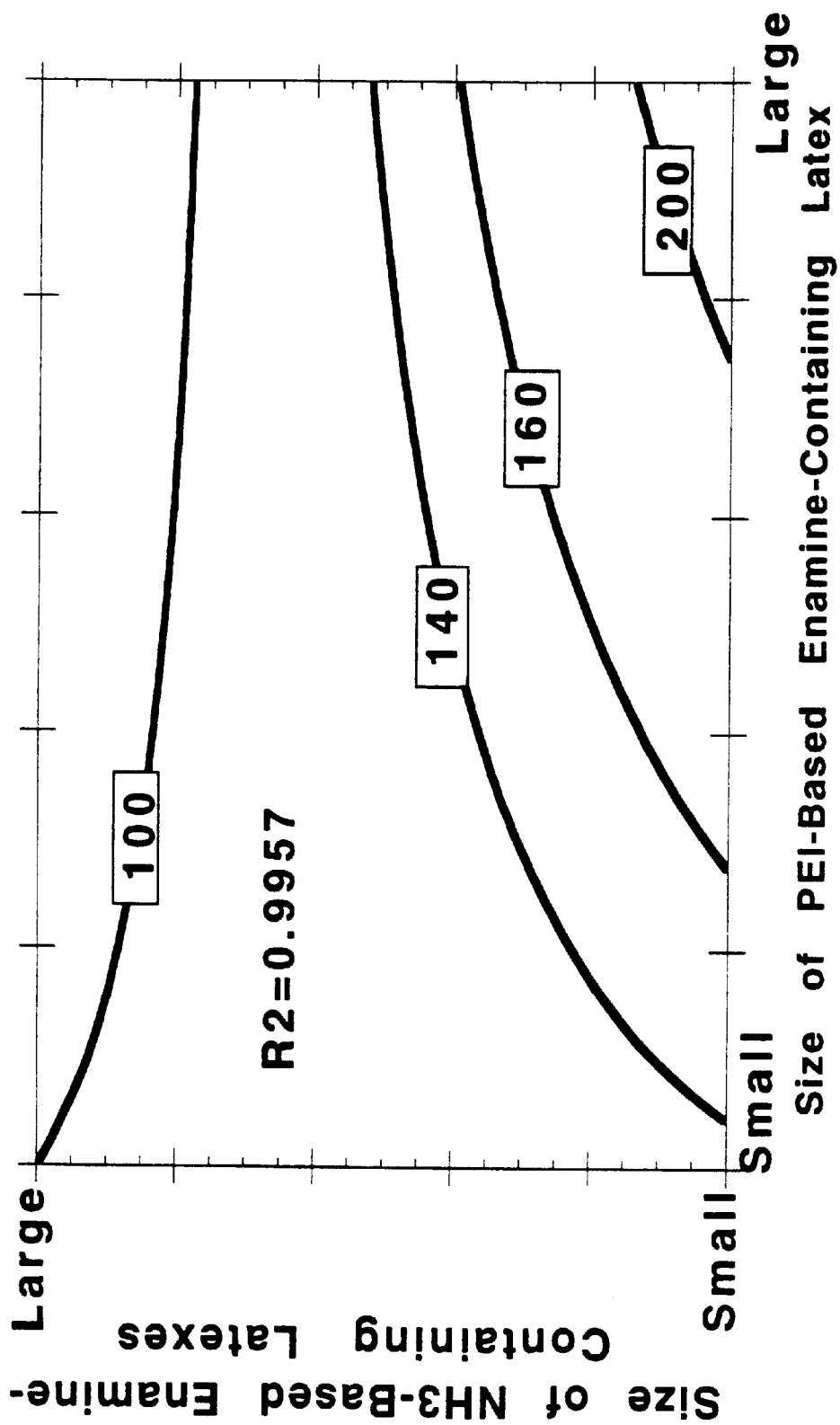
FIG. 5 depicts constant contour plots of methyl ethyl ketone double rubs as a function of latex particle size.

FIG. 4 depicts constant contour plots of methyl ethyl ketone double rubs as a function of the ammonia-based enamine-containing latexes and dry film thickness. The PEI-containing latex was added at a volume fraction of 25% (dry resin on dry resin). The plots were constructed assuming a one to one stoichiometric level of NH to enamine. For the plots, a large particle size PEI-containing latex was used. Films were cured at 72° F. (room temperature) at 50% relative humidity for 21 days. FIG. 5 depicts constant contour plots of methyl ethyl ketone double rubs as a function of latex particle size. The PEI-containing latex was added a volume fraction of 25% (dry resin on dry resin). The plots were constructed assuming a one to one stoichiometric level of N-H to enamine. Films were cured at 72° F. (room temperature) at 50% relative humidity for 21 days. The dry film thickness was 1.5 mil.

EXAMPLE 9

Preparation of Small Unstructured Enamine-Containing Waterborne Polymer Latex

To a 1000 mL resin kettle equipped with a condenser, nitrogen purge, and subsurface feed tube were added 290 g of water, 15.52 g of HITENOL HS-20, 2.55 g of TERGITOL NP-40 (70%), 3.5 g of sodium carbonate, 8.10 g of methyl methacrylate, 5.38 g of 2-ethylhexyl acrylate, and 4.43 g of acetoacetoxyethyl methacrylate. A nitrogen purge was begun, then the contents of the reactor brought up to 80° C. at 400 rpm. After reaching 80° C., an initiator charge composed of 2.30 g of sodium persulfate dissolved in 13.0 g of water was added to the reactor. An emulsion feed composed of 120 g of water, 6.55 g of AEROSOL 18, 10.22 g of TERGITOL NP-40 (70%), 153.66 g of methyl methacrylate, 102.03 g of 2-ethylhexyl acrylate, and 84.21 g of acetoacetoxyethyl methacrylate was begun at 8.38 g/min. Five minutes after the first emulsion feed was begun, an initiator solution composed of 1.3 g of sodium persulfate dissolved in 33.5 g of water was fed at 0.536 g/min. Five minutes after the monomer feed, an initiator solution of 0.40 g of t-butyl hydroperoxide, and 0.40 g of sodium formaldehyde sulfoxylate dissolved in 12 g of water was charged and heating continued for 30 minutes. The emulsion was cooled, and 27.7 g of ammonium hydroxide (28%) were pumped in over 15 minutes. The latex was then filtered through 100 mesh wire screen. Solids level, 43.3; amount of dried material (100 mesh screen), 0.12 g; particle size (Dn), 50 nm. Infrared analysis of clear films cast over ZnSe showed an absorption at 1568 cm$^{-1}$ which represents an enamine moiety.

EXAMPLE 10

Preparation of Small Unstructured PEI-Containing Waterborne Polymer Latex (Mole ratio of NH group to acetoacetoxy group was 4.0)

To a 1000 mL resin kettle equipped with a condenser, nitrogen purge, and subsurface feed tube were added 232 g of water, 12.42 g of HITENOL HS-20, 2.02 g of TERGITOL NP-40(70%), 2.8 g of sodium carbonate, 4.15 g of methyl methacrylate, 5.38 g of 2-ethylhexyl acrylate, and 4.33 g of acetoacetoxyethyl methacrylate. A nitrogen purge was begun, then the contents of the reactor brought up to 80° C. at 400 rpm. After reaching 80° C., an initiator charge composed of 1.84 g of sodium persulfate dissolved in 10.4 g of water was added to the reactor. An emulsion feed composed of 96 g of water, 5.24 g of AEROSOL 18, 8.18 g of TERGITOL NP-40 (70%), 78.90 g of methyl methacrylate, 110.82 g of 2-ethylhexyl acrylate, and 82.36 g of acetoacetoxyethyl methacrylate was begun at 8.38 g/min. Five minutes after the first emulsion feed was begun, an initial solution composed of 1.04 g dissolved in 26.8 g of water was fed at 0.536 g/min. Five minutes after the monomer feed, an initiator solution of 0.32 g of t-butyl hydroperoxide, and 0.32 g of sodium formaldehyde sulfoxylate dissolved in 9.6 g of water was charged and heating continued for 30 minutes. The emulsion was cooled to 30° C., and 139.58 g of poly(ethylenimine) (50% in water) were pumped in over 15 minutes. Mole ratio of N-H group to acetoacetoxy group was 4.00. The latex was then filtered through 100 mesh wire screen. Solids level, 42.8; pH, 10; amount of dried material (100 mesh screen), 0.10 g; particle size (Dw), 54 nm. Infrared analysis of clear films cast over ZnSe showed an absorption at 1653 cm$^{-1}$ and 1592 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed at most 1% of the poly(ethylenimine) remained in the water phase.

EXAMPLE 11

Evaluation of Films Prepared from the Polymer Latex of Example 9 and a Blend of the Polymer Latexes of Example 9 and Example 10

Blends were prepared similar to Example 8 by adding the appropriate weight fraction of PEI-containing latex to enamine-containing latex such that the weight fraction of PEI-containing latexes represented a weight fraction of 25% (dry resin on dry resin). Wet films were cast over ZnSe and cure at temperatures between 35° C. and 90° C. for up to 30 minutes. FT-IR analysis of the cured films showed an exchange reaction between of ammonia-based enamine-containing particles and PEI-containing particles during film formation. Analysis of the results showed that ammonia had evolved from the film, and that an organic-based enamine (from the active N-H on the PEI-containing particles) had formed on the original ammonia-based enamine-containing particles. More than 90% of the exchange reaction was over after heating a film for 30 minutes at 90° C. A film was cast over lenata paper 6 mils wet then heated for 30 minutes at 90° C. The film was tough, nontacky, and had excellent block and print resistance. When a film was prepared from Example 9 only and heated for 30 minutes at 90° C., FT-IR analysis showed no chemical reaction within the films. A film (from Example 9) was cast over Leneta paper at 6 mils wet then heated for 30 minutes at 90° C. for 30 minutes. The film was not tough and very tacky.

EXAMPLE 12

Preparation of Latex Blends from Examples 1, 2, 3, 4, 5, and 6

Latex blends were prepared in the ratio's shown in Table 3 below. The two latexes were blended using a laboratory mixer and while mixing, one percent of a surfactant, SUR-FYNOL 104 DPM, was added to aid the film in wetting the release paper for free film testing. The mixtures were rolled overnight before any films were cast. The resultant pH's and minimum film forming temperature's (MFFT) of the blends are shown in Table 4 below.

TABLE 3

| Sample | Enamine Latex Example | Vol Frac (Enamine Latex) % | PEI Latex Example | Vol Frac (PEI Latex) % | Surfynol 104 DPM |
|---|---|---|---|---|---|
| 12A | 1 | 75% | 2 | 25% | 1% |
| 12B | 1 | 75% | 3 | 25% | 1% |
| 12C | 1 | 75% | 5 | 25% | 1% |
| 12D | 1 | 75% | 6 | 25% | 1% |
| 12E | 4 | 75% | 2 | 25% | 1% |
| 12F | 4 | 75% | 3 | 25% | 1% |
| 12G | 4 | 75% | 5 | 25% | 1% |
| 12H | 4 | 75% | 6 | 25% | 1% |

TABLE 4

| | MFT (° C.) (Visual and Resist 2 Ranges) | | |
|---|---|---|---|
| EXAMPLE | Visual | Resist | pH |
| 12A | <5 | 16 | 10.8 |
| 12B | <5 | 14.1 | 11 |
| 12C | <5 | 15.8 | 10.8 |
| 12D | <5 | 13.6 | 10.9 |
| 12E | <5 | 13.8 | 10.6 |
| 12F | <5 | 14.8 | 10.7 |
| 12G | 6.2 | 15.8 | 10.6 |
| 12H | 5.8 | 16.1 | 10.7 |

Figure 6:
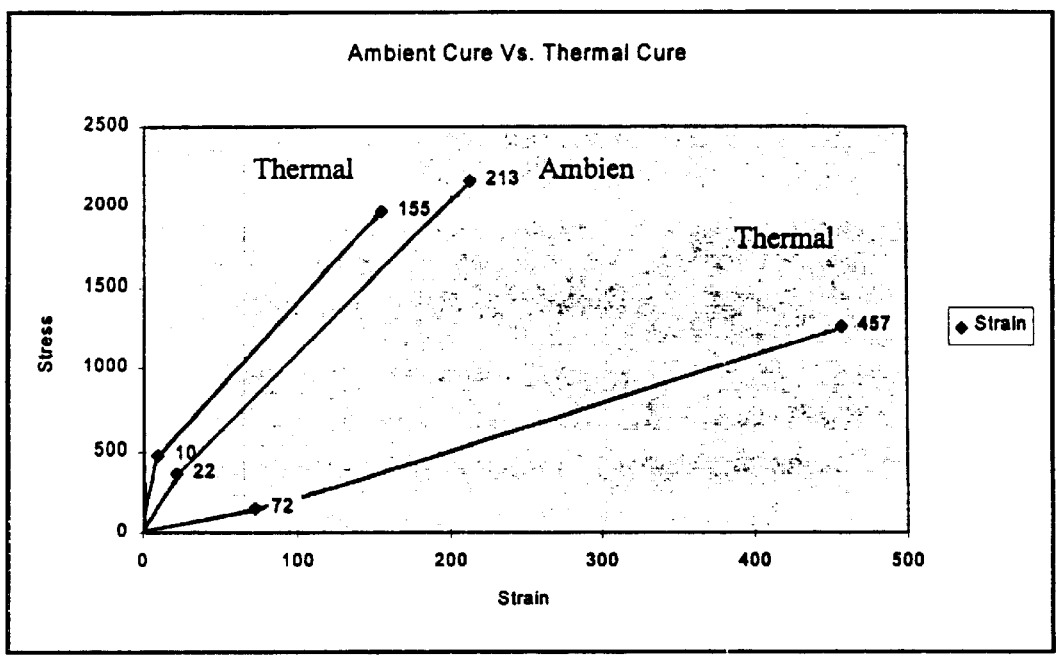
FIG. 6 depicts tensile properties of thermally and ambiently cured latexes of Example 12 A versus a control latex of Example 1.

FIG. 6 depicts tensile properties of thermally and ambiently cured blends of Example 12 A versus a control latex of Example 1.

EXAMPLE 13

Evaluation of Clear Films from Latex Blends Thermally Cured from Examples 12

Clear films were cast on release paper and cured ambiently for specified periods of time in the CTH room or cured for 30 minutes in a forced air oven at specified temperatures ranging from 75°–120° C. The films tensile properties, film gel fraction (FGF), film swell ratio (FSR), and Yellowness Index were determined. The results are shown in Tables 5–7 below. Table 5 reports the tensile properties. Table 6 reports FGF and FSR in tetrahydrofuran, (THF) and Acetone. Table 6 also reports the volatile content (VC) of the films. Table 7 presents the Yellowness Indices for the films at four different temperatures 75° C., 90° C., 105° C., and 120° C.

TABLE 5

| Tensile Properties (120° C. Cure for 30 Minutes) | | | | | | |
|---|---|---|---|---|---|---|
| Example | Ultimate Break | Ultimate Elong | Ultimate Work | Initial Modulus | Yield Break | Yield Elong |
| 1 | 1347 | 302 | 2490 | 12.2 | 392.0 | 9.6 |
| 12A | 1481 | 65 | 779 | 12.2 | 944.4 | 8.1 |
| 12B | 1550 | 62 | 796 | 22.2 | 991.6 | 10.0 |
| 12C | 1885 | 99 | 1344 | 27.5 | 956.2 | 8.9 |
| 12D | 1593 | 83 | 977 | 20.6 | 891.0 | 9.8 |
| 4 | 1252 | 457 | 2080 | 1.1 | 151.2 | 71.6 |
| 12E | 1959 | 155 | 1605 | 15.7 | 482.2 | 10.1 |
| 12F | 2011 | 129 | 1443 | 22.1 | 592.2 | 8.7 |
| 12G | 1661 | 123 | 1106 | 19.2 | 464.8 | 8.5 |
| 12H | 1629 | 110 | 1016 | 17.7 | 511.6 | 8.7 |

TABLE 6

| Example | 30 Min Cure (° C.) | Film (in THF) | | | Film (in Acetone) | | |
|---|---|---|---|---|---|---|---|
| | | FGF | FSR | VC | FGF | FSR | VC |
| 1 Control | 75° | | | | 62.37 | 9.70 | 1.26 |
| | | | | 0.20 | 0.60 | 0.05 | |
| | 90° | | | | 65.05 | 9.42 | 1.19 |
| | | | | 0.21 | 0.35 | 0.05 | |
| | 105° | | | | 68.78 | 11.66 | 1.62 |
| | | | | 0.43 | 0.47 | 0.32 | |
| | 120° | 73.06 | 15.58 | 1.33 | 72.04 | 9.64 | 1.12 |
| | | 0.22 | 1.0 | 0.39 | 0.26 | 0.97 | 0.13 |
| 12A | 75° | 93.18 | 6.08 | 2.77 | 90.25 | 5.28 | 1.47 |
| | | 0.31 | 0.07 | 0.17 | 0.10 | 1.10 | 0.13 |
| | 90° | 93.71 | 5.64 | 2.35 | 91.59 | 3.80 | 1.22 |
| | | 0.17 | 1.00 | 0.14 | 0.05 | 1.30 | 0.17 |
| | 105° | 93.19 | 5.60 | 1.65 | 92.06 | 4.30 | 1.05 |
| | | 0.27 | 0.28 | 0.13 | 0.16 | 0.57 | 0.17 |
| | 120° | 93.37 | 6.27 | 1.54 | 92.47 | 4.09 | 0.29 |
| | | 0.35 | 0.48 | 0.02 | 0.52 | 0.43 | 0.16 |
| 12B | 75° | 93.27 | 6.55 | 2.91 | 91.29 | 4.72 | 2.15 |
| | | 0.51 | 1.43 | 0.57 | 0.27 | 0.94 | 0.31 |
| | 90° | | 91.59 | 4.76 | 2.01 | | | |
| | | | 0.69 | 0.37 | 0.19 | | | |
| | 105° | | 91.70 | 4.38 | 1.80 | | | |
| | | | 0.90 | 0.74 | 0.30 | | | |
| | 120° | 92.47 | 92.47 | 1.36 | 92.83 | 4067 | 1.46 |
| | | 0.24 | 0.24 | 0.05 | 0.19 | 0.60 | 0.16 |
| 12C | 75° | | 92.28 | 4.36 | 2.06 | | | |
| | | | 0.47 | 0.56 | 0.05 | | | |
| | 90° | | 91.80 | 4.55 | 1.70 | | | |
| | | | 0.13 | 0.69 | 0.11 | | | |
| | 105° | | 92.18 | 4.68 | 1.56 | | | |
| | | | 0.18 | 0.49 | 0.41 | | | |
| | 120° | 91.58 | 5.91 | 1.16 | 92.84 | 5.04 | 1.26 |
| | | 0.76 | 0.74 | 0.54 | 0.10 | 0.75 | 0.20 |
| 12D | 75° | | 91.46 | 4.85 | 2.27 | | | |
| | | | 0.13 | 0.51 | 0.12 | | | |
| | 90° | | 92.14 | 4.72 | 1.85 | | | |
| | | | 0.20 | 0.36 | 0.08 | | | |
| | 105° | | 92.95 | 5.00 | 1.67 | | | |
| | | | 0.33 | 0.33 | 0.50 | | | |
| | 120° | 92.40 | 5.48 | 1.14 | 93.55 | 4.90 | 1.39 |
| | | 0.18 | 0.63 | 0.18 | 0.22 | 0.50 | 0.14 |
| 2 | 75° | | | | 80.58 | 10.97 | 1.86 |
| | | | | | 0.26 | 0.41 | 0.25 |

TABLE 6-continued

| Example | 30 Min Cure (° C.) | Film (in THF) FGF | FSR | VC | Film (in Acetone) FGF | FSR | VC |
|---|---|---|---|---|---|---|---|
| | 90° | | | | 81.83 | 10.13 | 1.27 |
| | | | | | 0.17 | 0.94 | 0.25 |
| | 105° | | | | 83.38 | 9.72 | 1.45 |
| | | | | | 0.15 | 0.63 | 0.52 |
| | 120° | | | | 84.42 | 9.63 | 1.10 |
| | | | | | 0.11 | 1.35 | 0.16 |
| 12E | 75° | | | | 91.84 | 4.10 | 2.01 |
| | | | | | 0.30 | 0.21 | 0.24 |
| | 90° | 91.57 | 6.22 | 1.56 | 91.07 | 4.719 | 1.29 |
| | | 0.14 | 0.50 | 0.21 | 0.13 | 0.48 | 0.28 |
| | 105° | 91.53 | 6.41 | 1.02 | 91.23 | 5.28 | 1.16 |
| | | 0.26 | 1.22 | 0.13 | 0.19 | 0.27 | 0.41 |
| | 120° | 90.98 | 6.70 | 1.23 | 91.84 | 5.45 | 1.14 |
| | | 0.59 | 0.87 | 0.45 | 0.23 | 0.93 | 0.14 |
| 12F | 75° | 92.53 | 6.73 | 1.99 | 92.30 | 4.59 | 2.06 |
| | | 0.21 | 1.00 | 0.20 | 0.22 | 0.45 | 0.31 |
| | 90° | 92.04 | 6.50 | 1.11 | 91.75 | 4.23 | 1.41 |
| | | 0.09 | 0.76 | 0.33 | 0.08 | 0.25 | 0.21 |
| | 105° | 92.71 | 6.05 | 1.32 | 92.75 | 4.81 | 1.63 |
| | | 0.34 | 0.30 | 0.05 | 0.24 | 0.34 | 0.14 |
| | 120° | 92.53 | 5.15 | 1.28 | 92.90 | 4.92 | 1.09 |
| | | 0.56 | 0.53 | 0.38 | 0.26 | 0.53 | 0.15 |
| 12G | 75° | | | | 91.40 | 4.83 | 1.75 |
| | | | | | 0.29 | 0.44 | 0.31 |
| | 90° | 91.55 | 6.56 | 1.12 | 91.14 | 5.31 | 1.22 |
| | | 0.14 | 0.48 | 0.18 | 0.42 | 0.83 | 0.20 |
| | 105° | 92.24 | 5.91 | 1.57 | 91.60 | 5.53 | 0.80 |
| | | 0.12 | 0.31 | 0.21 | 0.40 | 1.20 | 0.30 |
| | 120° | 91.47 | 6.60 | 1.13 | 92.00 | 5.47 | 0.96 |
| | | 0.14 | 0.62 | 0.35 | 0.13 | 0.24 | 0.03 |
| 12H | 75° | 91.88 | 6.34 | 1.63 | 91.42 | 4.22 | 1.55 |
| | | 0.75 | 0.18 | 0.24 | 0.34 | 0.44 | 0.31 |
| | 90° | 91.97 | 5.52 | 1.36 | 91.76 | 3.90 | 1.48 |
| | | 0.18 | 0.52 | 0.19 | 0.17 | 0.10 | 0.11 |
| | 105° | 92.22 | 5.84 | 1.20 | 92.67 | 4.65 | 1.93 |
| | | 0.11 | 0.31 | 0.27 | 0.21 | 0.80 | 0.14 |
| | 120° | 91.96 | 5.31 | 1.30 | 92.00 | 5.43 | 0.92 |
| | | 0.10 | 0.77 | 0.19 | 0.01 | 0.01 | 0.12 |

TABLE 7

| | 75° C. | | 90° C. | | 105° C. | | 120° C. | |
|---|---|---|---|---|---|---|---|---|
| Example | Index | Delta | Index | Delta | Index | Delta | Index | Delta |
| Standard | 6.53 | | 6.61 | | 6.62 | | 6.58 | |
| 12A | 10.27 | 3.74 | 10.64 | 4.03 | 10.92 | 4.3 | 12.04 | 5.46 |
| 12B | 10.19 | 3.66 | 10.56 | 3.95 | 11.03 | 4.41 | 13.66 | 7.08 |
| 12C | 11.72 | 5.19 | 12.88 | 6.27 | 16.07 | 9.45 | 22.57 | 15.99 |
| 12D | 9.76 | 3.23 | 10.31 | 3.7 | 10.81 | 4.19 | 12.8 | 6.22 |
| 12E | 9.12 | 2.59 | 9.3 | 2.69 | 9.77 | 3.15 | 10.71 | 4.13 |
| 12F | 8.91 | 2.38 | 9.12 | 2.51 | 9.53 | 2.91 | 10.76 | 4.18 |
| 12G | 8.73 | 2.2 | 8.9 | 2.23 | 9.24 | 2.62 | 10.36 | 3.78 |
| 12H | 8.87 | 2.34 | 9.09 | 2.48 | 9.77 | 3.15 | 10.65 | 4.07 |
| 1 | 7.87 | 1.34 | 7.96 | 1.34 | 8.18 | 1.56 | 8.36 | 1.78 |
| 2 w/SURF | 7.28 | 0.75 | 7.44 | 0.83 | 7.44 | 0.82 | 7.7 | 1.12 |
| 2 w/o SURF | 7.32 | 0.79 | 7.33 | 0.72 | 7.37 | 0.75 | 7.62 | 1.04 |

EXAMPLE 14

Evaluation of Clear Films of Latex Blends Ambiently Cured from Examples 12

Clear films were cast on release paper and cured ambiently for specified periods of time in the CTH room. Table 8 below demonstrates the development of film gel fraction (FGF) and film swell ratio (FSR) in the films as they cured. The 90% confidence limits are shown in parenthesis.

TABLE 8

| | 2 Day Film (THF) | | 8 Day Film (THF) | | 21 Day Film (THF) | |
|---|---|---|---|---|---|---|
| Example | FGF | FSR | FGF | FSR | FGF | FSR |
| 12A | 87.6 | 5.7 | 91.2 | 5.9 | 91.8 | 5.8 |
| | (0.5) | (1.2) | (0.2) | (0.5) | (0.2) | (0.7) |
| 12B | 88.3 | 5.8 | 90.5 | 6.1 | 92.2 | 6.1 |
| | (0.2) | (0.8) | (0.3) | (0.9) | (0.3) | (0.3) |
| 12C | 88.3 | 6.1 | 90.0 | 6.8 | 91.5 | 5.8 |
| | (0.3) | (0.5) | (0.4) | (1.0) | (0.10) | (0.5) |
| 12D | 88.5 | 7.0 | 91.0 | 5.6 | 92.7 | 6.1 |
| | (0.5) | (1.6) | (0.1) | (0.8) | (0.4) | (1.2) |
| 12E | 89.3 | 7.1 | 90.0 | 6.6 | 91.5 | 5.9 |
| | (0.2) | (0.6) | (0.1) | (0.5) | (0.1) | (0.6) |
| 12F | 90.2 | 6.4 | 90.6 | 6.6 | 91.8 | 5.6 |
| | (1.2) | (1.2) | (0.2) | (1.2) | (0.3) | (0.6) |
| 12G | 90.2 | 7.2 | 90.5 | 7.1 | 91.2 | 6.4 |
| | (0.5) | (0.7) | (0.2) | (1.5) | (0.2) | (0.9) |
| 12H | 90.2 | 6.5 | 91.4 | 6.2 | 91.3 | 6.1 |
| | (0.2) | (0.2) | (0.3) | (0.4) | (0.2) | (0.4) |

EXAMPLE 15

Preparation of Large Core/Shell Allyl/Acetoacetoxy-Containing Waterborne Particles To a 3000 mL resin kettle equipped with a condenser, nitrogen purge, and subsurface feed tube were added 529.6 g of water, 2.87 g of TREM LF-40, 1.36 g of TERGITOL NP-40 (70%), 7.1 g of sodium carbonate, 5.01 g of methyl methacrylate, 28.95 g of styrene, 17.54 g of methyl methacrylate, 33.78 g of 2-ethylhexyl acrylate, and 0.16 g of trimethylolpropane triacrylate. A nitrogen purge was begun, then the contents of the reactor brought up to 80° C. at 400 rpm. After reaching 80° C., an initiator solution composed of 5.28 g of sodium persulfate dissolved in 20.88 g of water was added to the reactor. An initiator solution composed of 3.56 g of sodium persulfate dissolved in 53.77 g of water was fed into the reactor at 0.336 g/min. Ten minutes after the initiator feed was started, an emulsion feed composed of 192.6 g of water, 8.31 g of TREM LF-40, 7.25 g of TERGITOL NP-40 (70%), 107.72 g of methyl methacrylate, 177.89 g of styrene, 207.54 g of 2-ethylhexyl acrylate, and 0.98 g of trimethylolpropane triacrylate was begun at 5.25 g/min. After the first emulsion feed was completed, the lines were rinsed with 160 g of water, and heating continued. After 25 minutes, a second emulsion feed composed of 205 g of water, 15.73 g of AEROSOL 18, 6.12 g of TERGITOL NP-40 (70%), 251.8 g of styrene, 175.1 g of 2-ethylhexyl acrylate, 94.94 g of acetoacetoxyethyl methacrylate, 47.92 g of allyl methacrylate, 23.99 g of dimethylaminoethyl methacrylate, and 4.79 g of 2-ethylhexyl 3-mercaptopropionate was started at 8 g/minute. Ten minutes after the feeds were completed, an initiator solution composed of 1.34 g of sodium formaldehyde sulfoxylate and 1.34 g of t-butylhydroperoxide dissolved in 40.2 g of water was fed into the reactor over 15 minutes. The latex was then filtered through 100 mesh wire screen. Solids level, 47%; amount of dried material (100 mesh screen), 1.7 g.

EXAMPLE 16

Preparation of Small Core/Shell Amine-Containing Waterborne Particles

To a 3000 mL resin kettle equipped with a condenser, nitrogen purge, and subsurface feed tube were added 1100 g of water, 49 g of HITENOL HS-20, 8.05 g of TERGITOL NP-40 (70 %), 7.3 g of sodium carbonate, 36.6 g of methyl methacrylate, 36.1 g of styrene, 36.2 g of 2-ethylhexyl acrylate, and 0.335 g of trimethylolpropane triacrylate. A nitrogen purge was begun, then the contents of the reactor brought up to 80° C. at 400 rpm. After reaching 80° C., an initiator solution composed of 7.05 g of sodium persulfate dissolved in 43.55 g of water was added to the reactor. An initiator solution composed of 4.36 g of sodium persulfate dissolved in 112 g of water was started at 0.466 g/min. Thirty minutes after the initiator feed was begun, an emulsion feed composed of 355 g of water, 19.65 g of AEROSOL 18, 20.19 g of TERGITOL NP-40 (70%), 224.84 g of methyl methacrylate, 221.95 g of styrene, 224.4 g of 2-ethylhexyl acrylate, and 2.06 g of trimethylolpropane triacrylate was begun at 5.24 g/min. After the first emulsion feed was completed, a second emulsion feed composed of 147 g of water, 12.15 g of AEROSOL 18, 12.48 g of TERGITOL NP-40 (70%), 168.6 g of styrene, 80 g of 2-ethylhexyl acrylate, and 167.9 g of acetoacetoxyethyl methacrylate was fed at 8.4 g/min. Ten minutes after the feeds were completed, an initiator solution composed of 1.34 g of sodium formaldehyde sulfoxylate and 1.34 g of t-butylhydroperoxide dissolved in 40.2 g of water was charged to the reactor and heating continued for 30 minutes. The emulsion was cooled to less than 35° C., and 283.84 g of polyethylenimine (50%) were pumped in over 15 minutes. The latex was then filtered through 100 mesh wire screen. Solids level, 41.8; amount of dried material (100 mesh screen), 0.60 g; pH, 10.5. Infrared analysis of clear films cast over ZnSe showed an absorption at 1565 $cm^{-1}$ which represents an enamine moiety.

EXAMPLE 17

Preparation of Zero Volatile Organic Compound (V.O.C.) Pigment Grind

A 15 gallon grind was prepared using a Premier disperser, as below, and a portion of the grind was used to letdown each specified paint.

| Material: | Volume: |
|---|---|
| Water | 48.00 |
| TAMOL 1124 | 4.00 |
| TRITON CF-10 | 2.00 |
| FOAMASTER AP | 2.00 |
| DOWICIL 75 | 1.00 |

The materials were dispersed well. Then pigment was added under agitation:

| TI-PURE R-900 | 200.00 |
|---|---|

After Cowles, the grind passes 7+Hegman and water was added:

| Water | 19.00 |
|---|---|

After filtering through a Fulflo filter, the grind was stored.

EXAMPLE 18

Preparation of Semigloss Latex Coatings Using Latexes from Examples 1, 2, 4, 5, 15, and 16 and the Grind of Example 17.

The following paint letdowns were prepared using the Zero V.O.C. Grind of Example 17 and by adding the ingredients shown in Table 9. The ingredients were added in the order shown in Table 9. All amounts shown are in grams. If required, the final coating composition is adjusted to pH 9 with ammonium hydroxide (28% by weight in water).

TABLE 9

| Ingredient | 18A | 18B | 18C | 18D | 18E | 18F | 18G |
|---|---|---|---|---|---|---|---|
| Ex. 17 | 136 | 140 | 140 | 140 | 140 | 140 | 140 |
| Ex. 1 |  | 185 | 185 | — | — | 185 | — |
| Ex. 4 |  | — | — | 206.5 | 206.5 | — | 206.5 |
| Ex. 2 |  | 60.5 | — | 60.5 | — | — | 60.5 |
| Ex. 5 |  | — | 68.0 | — | 68.0 | 68.0 | — |
| Ex. 15 | 179 |  |  |  |  |  |  |
| Ex. 16 | 68.0 |  |  |  |  |  |  |
| Premix* | 9.9 | 7.6 | 7.6 | 7.6 | 7.6 | 7.6 | 7.6 |
| DI Water | 69.0 | 54.0 | 46.5 | 32.5 | 25.0 | 44.5 | 30.5 |
| RM-5 | — | — | — | — | — | 52 | 52 |
| SCT 275 | — | 50 | 50 | 50 | 50 | — | — |
| CRs Sol'n. | 52.0 | — | — | — | — | — | — |
| Cellosize 4400 Sol'n | — | 34.6 | 34.6 | 34.6 | 34.6 | — | — |

*Premix: 100 g FOAMASTER AP; 150 g FOAMASTER VF; 500 g SURFYNOL 104.

EXAMPLE 19

Evaluation of Latex Blends Ambiently Cured from Example 18

Paint compositions containing the blends of latexes from Example 1 were evaluated for gloss, wet adhesion, scrub resistance (scrub), blocking resistance, print resistance, stain, mudcrack, and LTC. The results are shown in Tables 10-14 below. Table 10 also reports the composition of each paint.

TABLE 10

| | Paint Composition | | | | Gloss | |
|---|---|---|---|---|---|---|
| | 75% | 25% | Thickener | Cobalt | 60° | 20° |
| 18A | Ex. 15 | Ex. 16 | RM-5 | YES | 56 | 14 |
| 18B | 1 | 2 | SCT 275 | NO | 48 | 10 |
| 18C | 1 | 5 | SCT 275 | NO | 36 | 5 |
| 18D | 4 | 2 | SCT 275 | NO | 58 | 17 |
| 18E | 4 | 5 | SCT 275 | NO | 48 | 12 |
| 18F | 1 | 5 | RM-5 | NO | 59 | 16 |
| 18G | 4 | 2 | RM-5 | NO | 62 | 22 |

TABLE 11

| | Wet Adhesion (# days dry, D) | | | | | Scrub | | |
|---|---|---|---|---|---|---|---|---|
| | 1D | 1D | 8D | 15D | 15D | | | |
| Paint | BT* | F** | BT | BT | F | 8 day | 15 day | 22 day |
| 18A | 2392 | 3K | | | | | | |
| 18B | 3K | 3K | 3K | 3K | 3K | 967 | 721 | 901 |
| 18C | 3K | 3K | 3K | 3K | 3K | 941 | 430 | 1000 |
| 18D | 3K | 3K | 3K | | | 1000 | | |
| 18E | 3K | 3K | 3K | | | 1000 | | |
| 18F | 3K | 3K | 3K | 3K | 3K | 628 | 1000 | |
| 18G | 2433 | 3K | 3K | 3K | 3K | 744 | 1000 | |

*BT = breakthrough; **F = failure

TABLE 12

Block Resistance:

| Paint | 1 Day Face To Face (FTF) | | | | 7 Day Face To Face (FTF) | | | | ASTM heated |
|---|---|---|---|---|---|---|---|---|---|
| | 1 | 2 | 7 | 21 | 1 | 2 | 7 | 21 | |
| 18A | 9 | 9 | | | | | | | |
| 18B | 6 | 6 | 7 | 8 | 5 | 5 | 7 | 7 | 9 |
| 18C | 6 | 6 | 7 | 7 | 4 | 5 | 7 | 6 | 9 |
| 18D | 6 | 6 | 6 | 8 | 4 | 5 | 6 | 6 | 9 |
| 18E | 6 | 7 | 7 | 8 | 5 | 5 | 6 | 7 | 9 |
| 18F | 5 | 6 | 7 | 5 | 4 | 4 | 6 | 4 | 9 |
| 18G | 5 | 6 | 7 | 5 | 4 | 5 | 5 | 4 | 7 |

TABLE 13

Print Resistance:

| Paint | 1 Day FTF | | | | 7 Day FTF | | | | ASTM heated |
|---|---|---|---|---|---|---|---|---|---|
| | 1 | 2 | 7 | 21 | 1 | 2 | 7 | 21 | |
| 18A | 8 | 8 | | | | | | | |
| 18B | 6 | 6 | 8 | 10 | 6 | 6 | 8 | 8 | 10 |
| 18C | 6 | 6 | 8 | 8 | 6 | 6 | 8 | 8 | 10 |
| 18D | 6 | 4 | 6 | 10 | 6 | 6 | 6 | 6 | 10 |
| 18E | 6 | 8 | 8 | 8 | 6 | 6 | 8 | 8 | 10 |
| 18F | 4 | 6 | 6 | 8 | 4 | 4 | 4 | 6 | 8 |
| 18G | 4 | 6 | 8 | 8 | 4 | 4 | 6 | 6 | 8 |

TABLE 14

| Paint | Cumulative Stain | Mudcrack | LTC |
|---|---|---|---|
| 18A | | NO | −0.7 |
| 18B | 35 | YES | |
| 18C | 33 | NO | −0.9 |
| 18D | 31 | NO | −0.9 |
| 18E | 34 | YES | |
| 18F | 33 | NO | −0.3 |
| 18G | 32 | NO | −0.6 |

EXAMPLE 20

Preparation of Large Unstructured Acetoacetoxy-Containing Waterborne Particles (Particle contains 12% AAEM)

To a 1000 mL resin kettle equipped with a condenser, nitrogen purge, and subsurface feed tube were added 294 g of water, 1.34 g of TREM LF-40, 1.79 g of TERGITOL NP-40 (100%), 2.044 g of sodium carbonate, 9.67 g of styrene, 6.09 g of 2-ethylhexyl acrylate, and 0.01 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 9.94 g of AEROSOL 18, 7.16 g of TERGITOL NP-40 (100%), 186.6 g of styrene, 115.63 g of 2-ethylhexyl acrylate, 40.81g of acetoacetoxyethyl methacrylate, and 0.52g of sodium 2-acrylamido-2-methylpropanesulfonate (50% in water) was fed into the reactor at 1.72 g/min. Five minutes after the feeds were completed, then an initiator solution composed of 0.4 g of sodium persulfate and 0.4 g of sodium metabisulfite dissolved in 12 g of water was added to the reactor and heating continued for 30 minutes. The latex was then filtered through 100 mesh wire screen. Solids level, 42.6; amount of dried material (100 mesh screen), 0.20 g; particle size (Dw), 153 nm; Tg of Polymer, 14° C.

EXAMPLE 21

Preparation of Large Unstructured Acetoacetoxy-Containing Waterborne Particles (Particle contains 15% AAEM)

To a 1000 mL resin kettle equipped with a condenser, nitrogen purge, and subsurface feed tube were added 351 g of water, 0.76 g of AEROSOL OT, 5.11 g of ITERGITOL NP-40 (100%), 2.05 g of sodium carbonate, 3.58 g of styrene, 11.63 g of 2-ethylhexyl acrylate, and 2.68g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, a monomer feed composed of 4.10 g of AEROSOL OT (75%), 88.02 g of styrene, 221.06 g of 2-ethylhexyl acrylate, 51.01 g of acetoacetoxyethyl methacrylate, and 0.26g of sodium 2-acrylamido-2-methylpropanesulfonate (50% in water) was fed into the reactor at 1.72 g/min. Five minutes after the feeds were completed, then an initiator solution composed of 0.4 g of sodium persulfate and 0.4 g of sodium metabisulfite dissolved in 12 g of water was added to the reactor and heating continued for 30 minutes. The latex was then filtered through 100 mesh wire screen. Solids level, 47.6; amount of dried material (100 mesh screen), 0.10 g; particle size (Dw), 122 nm; Tg of Polymer, −28° C.

EXAMPLE 22

Preparation of Large Unstructured Acetoacetoxy-Containing Waterborne Particles (Particle contains 7.5% AAEM)

To a 1000 mL resin kettle equipped with a condenser, nitrogen purge, and subsurface feed tube were added 294 g of water, 1.34 g of TREM LF-40, 1.79 g of TERGITOL NP-40 (100%), 2.044 g of sodium carbonate, 12.71 g of styrene, 3.84 g of isooctyl acrylate, and 0.014 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 9.94 g of AEROSOL 18, 7.16 g of TERGITOL NP-40 (100%), 241.47 g of styrene, 73.02 g of isooctyl acrylate, 25.61 g of acetoacetoxyethyl methacrylate, and 0.52 g of sodium 2-acrylamido-2- methylpropanesulfonate (50% in water) was fed into the reactor at 1.72 g/min. Five minutes after the initiator solution feed was in, an initiator solution of 0.72 g of sodium formaldehyde sulfoxylate and 1.03 g of t-butylhydroperoxide dissolved in 12 g of water was added to the reactor. The latex was then filtered through 100 mesh wire screen. Solids level, 43.8; amount of dried material (100 mesh screen); 3.3 g; pH, 7.4; particle size (Dw), 151 nm; Tg of Polymer, 16° C.

EXAMPLE 23

Preparation of Large Core/Shell Amine-Containing Waterborne Particles (Particle contains 12% AAEM, Ratio N-H to Enamine, 3.6)

To a 1000 mL resin kettle equipped with a condenser, nitrogen purge, and subsurface feed tube were added 192 g of water, 1.22 g of TREM LF40, 0.79 g of TERGITOL NP-40 (70%), 2.4 g of sodium carbonate, 13.55 g of methyl methacrylate, 1.21 g of styrene, 17.24 g of 2-ethylhexyl acrylate, 0.10 g of trimethylolpropane triacrylate, and 6.04 g of acetoacetoxyethyl methacrylate. A nitrogen purge was begun, then the contents of the reactor brought up to 80° C. at 400 rpm. After reaching 80° C., an initiator solution composed of 2.31 g of sodium persulfate dissolved in 13.06 g of water was added to the reactor. An initiator solution composed of 1.31 g of sodium persulfate dissolved in 34 g of water was started at 0.54 g/min. Thirty minutes after the initiator feed was begun, an emulsion feed composed of 106 g of water, 3.51 g of TREM LF-40, 3.06 g of TERGITOL NP-40 (70%), 83.23 g of methyl methacrylate, 7.44 g of styrene, 105.91 g of 2-ethylhexyl acrylate, and 0.619 g of trimethylolpropane triacrylate was begun at 8.38 g/min. After the first emulsion feed was completed, the feed lines were washed with 80 g of water, and the temperature held at 80° C. for 30 minutes. A second emulsion feed composed of 53 g of water, 3.84 g of AEROSOL 18, 1.53 g of TERGITOL NP-40 (70%), 63.31 g of styrene, 24.0 g of 2-ethylhexyl acrylate, 37.13 g of acetoacetoxyethyl methacrylate, and 0.50 g of the sodium 2-acrylamido-2-methylpropanesulfonate (50% in water) was fed at 8.38 g/min. Five minutes after the initiator solution feed was in, an initiator solution of 0.40 g of sodium formaldehyde sulfoxylate and 0.40 g of t- butylhydroperoxide dissolved in 12.1 g of water was added to the reactor. . The emulsion was cooled to less than 35° C., and 69.51 g of polyethylenimine (50%) were pumped in over 15 minutes. The latex was then filtered through 100 mesh wire screen. Solids level, 46.6; amount of dried material (100 mesh screen), 0.15 g; particle size (Dw), 167 nm; Tg, 5° C.

EXAMPLE 24

Preparation of Large Core/Shell Amine-Containing Waterborne Particles (Particle contains 12% AAEM, Ratio N-H to Enamine, 1.1)

To a 1000 mL resin kettle equipped with a condenser, nitrogen purge, and subsurface feed tube were added 640 g of water, 4.05 g of TREM LF-40, 1.93 g of TERGITOL NP-40 (70%), 8.0 g of sodium carbonate, 55.23 g of methyl methacrylate, 4.04 g of styrene, 47.4 g of 2-ethylhexyl acrylate, 0.33 g of trimethylolpropane triacrylate, and 20.1 g of acetoacetoxyethyl methacrylate. A nitrogen purge was begun, then the contents of the reactor brought up to 80° C. at 400 rpm. After reaching 80° C., an initiator solution composed of 7.0 g of sodium persulfate dissolved in 43.6 g of water was added to the reactor. An initiator solution composed of 4.36 g of sodium persulfate dissolved in 122 g of water was started at 0.54 g/min. Thirty minutes after the initiator feed was begun, an emulsion feed composed of 355 g of water, 11.7 g of TREM LF-40, 10.21 g of TERGITOL NP-40 (70%), 399.3 g of methyl methacrylate, 24.78 g of styrene, 291.2 g of 2-ethylhexyl acrylate, and 2.06 g of trimethylolpropane triacrylate was begun at 8.38 g/min. After the first emulsion feed was completed, the feed lines were washed with 80 g of water, and the temperature held at 80° C. for 30 minutes. A second emulsion feed composed of 171 g of water, 12.79 g of AEROSOL 18, 5.09 g of TERGITOL NP-40 (70%), 211 g of styrene, 80.0 g of 2-ethylhexyl acrylate, 123.8 g of acetoacetoxyethyl methacrylate, and 1.68 g of the sodium 2-acrylamido-2-methylpropanesulfonate (50% in water) was fed at 8.38 g/min. Five minutes after the initiator solution feed was in, an initiator solution of 1.34 g of sodium formaldehyde sulfoxylate and 1.34 g of t- butylhydroperoxide dissolved in 40.2 g of water was added to the reactor. . The emulsion was cooled to less than 35° C., and 121 g of polyethylenimine (50%) were pumped in over 15 minutes. The latex was then filtered through 100 mesh wire screen. Solids level, 46.6; amount of dried material (100 mesh screen), 25 g; particle size (Dw), 450 nm; Tg, 14° C.; pH, 10.4

EXAMPLE 25

Preparation and Evaluation of blend Prepared Using the Latexes from Examples 20–24

To 100 parts of acetoacetoxy-containing latexes from Examples 20, 21, or 22 were added with stirring the appropriate weight fraction of amino-containing latex from Example 23 or 24 (dry resin of acetoacetoxy-containing latex to amino- containing latex). Six mil films were cast over Al panels then cured in a forced-air oven for 30 minutes. The results are shown in Table 15.

TABLE 15

| Example Acetoacetoxy-latex | Example Amine-Latex | Wt. Fraction of Amine-Containing Latex | Ratio of N-H to Enamine in Amine-Containing Latex | Cure Temperature (° C.) | Methyl Ethyl Ketone Double Rubs per Mil |
|---|---|---|---|---|---|
| 20 | 23 | 0.255 | 3.6 | 150 | 132 |
| 20 | 23 | 0.255 | 3.6 | 140 | 31 |
| 21 | 23 | 0.305 | 3.6 | 150 | 300 |
| 21 | 23 | 0.305 | 3.6 | 140 | 99 |
| 21 | 23 | 0.305 | 3.5 | 125 | 39 |
| 22 | 24 | 0.38 | 1.1 | 150 | 283 |

EXAMPLE 26

Preparation of Large Core/Shell Allyl/ Acetoacetoxy-Containing Waterborne Polymer Latex To a 3000 mL resin kettle equipped with a condenser, nitrogen purge, and subsurface feed tube were added 480 g of water, 1.30 g of HITENOL HS-20, 1.08 g of TERGITOL 15-S-40 (100%), 5.84 g of sodium carbonate, 5.01 g of methyl methacrylate, 8.27 g of styrene, 9.63 g of 2-ethylhexyl acrylate, and 0.0689 g of trimethylolpropane triacrylate. A nitrogen purge was begun, then the contents of the reactor brought up to 80° C. at 400 rpm. After reaching 80° C., an initiator solution composed of 6.16 g of sodium persulfate dissolved in 34.84 g of water was added to the reactor. An initiator solution composed of 3.48 g of sodium persulfate dissolved in 89.8 g of water was fed into the reactor at 0.336 g/min. Ten minutes after the initiator feed was started, an emulsion feed composed of 210.4 g of water, 2.75 g of AEROSOL OT, 5.72 g of TERGITOL 15-S-40 (100%), 95.21 g of methyl methacrylate, 157.23 g of styrene, 183.02 g of 2-ethylhexyl acrylate, and 1.31 g of trimethylpropane triacrylate was begun at 5.25 g/min. After the first emulsion feed was completed, the lines were rinsed with 60 g of water, and heating continued. After 25 minutes, a second emulsion feed composed of 138 g of water, 8.74 g of AEROSOL 18,2.85 g of TERGITOL 15-S-40 (100%), 225.8 g of styrene, 153.5 g of 2-ethylhexyl acrylate, 47.97 g of acetoacetoxyethyl methacrylate, 28.78 g of allyl methacrylate, 18.81 g of dimethylaminoethyl methacrylate, and 4.894 g of 2- ethylhexyl 3-mercaptopropionate was started at 8 g/minute. Ten minutes after the feeds were completed, the reactor was cooled to 65° C., then an initiator solution composed of 2.74 g of sodium formaldehyde sulfoxylate dissolved in 32.2 g of water, and 5.05 g of a catalyst solution composed of 0.5% iron (II) sulfate chelated with ethylenediamine tetracetic acid were added to the reactor. A solution of 2.94 g oft-butylhydroperoxide dissolved in 32.2 g of water was fed into the reactor over 15 minutes. The latex was then filtered through 100 mesh wire screen. Solids level, 46.9; pH, 7.6; amount of dried material (100 mesh screen), 2.0 g; particle size (Dw), 197 nm.

EXAMPLE 27

Preparation of Small Core/Shell Amine-Containing Waterborne Particles

To a 3000 mL resin kettle equipped with a condenser, nitrogen purge, and subsurface feed tube were added 720.4 g of water, 39.2 g of HITENOL HS-20, 1.08 g of TERGITOL 15- S-40 (100%), 5.84 g of sodium carbonate, 26.14 g of methyl methacrylate, 35.2 g of styrene, 26.4 g of 2-ethylhexyl acrylate, and 0.264 g of trimethylolpropane triacrylate. A nitrogen purge was begun, then the contents of the reactor brought up to 80° C. at 400 rpm. After reaching 80° C., an initiator solution composed of 6.16 g of sodium persulfate dissolved in 34.84 g of water was added to the reactor. An initiator solution composed of 2.08 g of sodium persulfate dissolved in 53.6 g of water was started at 0.336 g/min. Thirty minutes after the initiator feed was begun, an emulsion feed composed of 158.4 g of water, 15.72 g of AEROSOL 18, 11.00 g of TERGITOL 15-S-40 (100%), 110.4 g of methyl methacrylate, 148.7 g of styrene, 111.52 g of 2-ethylhexyl acrylate, and 1.12 g of trimethylolpropane triacrylate was begun at 5.24 g/min. After the first emulsion feed was completed, the feed lines were washed with 80 g of water, and the temperature held at 80° C. for 30 minutes. The reactor was then cooled to 65° C., and an initiator solution of 2.74 g of sodium formaldehyde sulfoxylate dissolved in 16 g of water, and 5.05 g of a catalyst solution composed of 0.5% iron (II) sulfate chelated with ethylenediamine tetracetic acid were added to the reactor. A second emulsion feed composed of 138.4 g of water, 9.72 g of AEROSOL 18, 6.99 g of TERGITOL 15-S-40 (100%), 191.90 g of styrene, 43.25 g of methyl methacrylate, 143.92 g of 2-ethylhexyl acrylate, 95.95 g of acetoacetoxyethyl methacrylate, and 9.45 g of the sodium 2-acrylamido-2-methylpropanesulfonate (50% in water) was fed at 5.24 g/min. A solution of 3.92 g of t-butylhydroperoxide dissolved in 32 g of water was fed into the reactor during the second emulsion feed at 0.14 g/min. After the t-butylhydroperoxide feed was completed, heating was continued for 30 minutes. The emulsion was cooled to less than 35° C., and 122 g of polyethylenimine (50%) were pumped in over 15 minutes. The latex was then filtered through 100 mesh wire screen. Solids level, 44.6; amount of dried material (100 mesh screen), 1.1 g; particle size (Dw), 54 nm; pH, 10.5. Infrared analysis of clear films cast over ZnSe showed an absorption at 1565 cm$^{-1}$ which represents an enamine moiety.

EXAMPLE 28

Preparation of a low pH blend using the Latexes from Examples 26 and 27

To 233.1 g of Example 27 were added with stirring 700 g of Example 26; pH, 10.5. While stirring the blend of Example 26 and 27, 25.2 g of ammonium bicarbonate (25% in water) was added. The pH was 9.2. Samples of this blend were stable at 60° C. for greater than 14 days.

EXAMPLE 29

Preparation of Low Volatile Organic Compound (V.O.C.) Pigment Grind

A grind was prepared using a Premier disperser, as below, and a portion of the grind was used to letdown each specified paint.

| Material: | Volume: |
| --- | --- |
| DI Water | 120.0 |
| TAMOL 1124 | 12.0 |
| TRITON CF-10 | 6.0 |
| Propylene Glycol | 6.0 |
| FOAMASTER AP | 6.0 |

The materials were dispersed well and then was added under agitation:

| TI-PURE R-900 | 600.0 |
| --- | --- |

After Cowles until the grind passed 7+ Hegman, then water was added:

| Water | 37.5 |
| --- | --- |

EXAMPLE 30

Preparation of Low V.O.C. Paints using Latex from Examples 26 and 28

Paint Letdown

|  | Weight (g): | | |
|---|---|---|---|
| Material: | Ex. 30A | Ex. 30B | Ex. 30C |
| Latex | Example 26 | Example 28 | Example 28 |
| Example 29 Grind | 137.02 | 138.02 | 137.02 |
| Example Latex | 216.0 | 238.68 | 238.68 |
| Texanol | 6.5 | 6.5 | 6.5 |
| FOAMASTER AP)Premix | 1.04 | 1.04 | 1.04 |
| FOAMASTER VF) | 1.56 | 1.56 | 1.56 |
| 5% Cobalt Hydrocure II) | 2.34 | 2.34 | — |

The above were mixed with stirring then the following were added:

| RM 2020 | 56.16 | 56.16 | 56.16 |
|---|---|---|---|
| (50% aqueous by weight) | | | |
| DI Water | 39.0 | 39.0 | 41.0 |
| Ammonia | 0.8 | — | — |
| (28% aqueous by weight) | | | |
| CR2 | 24.26 | 7.36 | 7.59 |
| (60% aqueous by weight) | | | |
| Resulting pH: | 8.55 | 8.65 | 8.79 |
| KU Viscosity: | 88 | 104 | 99 |
| ICI Viscisity (P) | 2.09 | 2.09 | 1.90 |
| Brookfield Viscosity* (cP) | 5,760 | 11,240 | 8480 |

*spindle 3 at 3 rpm

Paints 30A, 30B, and 30C were evaluated for gloss, color, scrub resistance, alkali resistance, blocking resistance, and print resistance. The results are shown on Tables 16-20.

TABLE 16

| Paint | Gloss 60/20 | Color L,a,b | Scrub Days Dry 1D | Scrub Days Dry 7D | BT/TF Wet Adhesion Days/Dry 1D | BT/TF Wet Adhesion Days/Dry 7D | Alkali Resist 7D Dry |
|---|---|---|---|---|---|---|---|
| 30A | 73/31 | 95.17, 0.39, 2.21 | 89 | 277 | 87/181 | 865/2311 | 6.5% |
| 30B | 68/25 | 93.66, 2.56, 4.26 | 227 | 612 | 825/1812 | 2310/3000+ | 4.4% |
| 30C | 67/22 | 97.49, 2.15, 4.05 | 441 | 982 | 1236/1814 | 3000+/3000+ | 1.4% |

TABLE 17

Blocking Resistance: Days (D) dry - Days (D) Face-To-Face (FTF)

| Paint | 1D-1D | 1D-7D | 2D-1D | 2D-7D | 7D-1D | 7D-7D |
|---|---|---|---|---|---|---|
| 30A | 4 | 3 | 4 | 4 | 5 | 4 |
| 30B | 5 | 4 | 5 | 5 | 6 | 7 |
| 30C | 5 | 5 | 2 | 5 | 6 | 7 |

TABLE 18

Blocking Resistance: Days (D) dry - 30 Minutes FTF at 120° F.

| Paint | 1D | 2D | 7D |
|---|---|---|---|
| 30A | 1 | 2 | 4 |
| 30B | 3 | 4 | 5 |
| 30C | 4 | 4 | 5 |

TABLE 19

Paint Resistance: Days (D) dry - Days (D) Face-To-Face (FTF)

| Paint | 1D-1D | 1D-7D | 2D-1D | 2D-7D | 7D-1D | 7D-7D |
|---|---|---|---|---|---|---|
| 30A | 2 | 2 | 4 | 4 | 4 | 2 |
| 30B | 8 | 6 | 8 | 6 | 8 | 4 |
| 30C | 6 | 4 | 6 | 4 | 8 | 4 |

TABLE 20

Paint Resistance: Days (D) dry - 30 Minutes FTF at 120° F.

| Paint | 1D | 2D | 7D |
|---|---|---|---|
| 30A | 4 | 6 | 6 |
| 30B | 8 | 8 | 6 |
| 30C | 6 | 8 | 8 |

EXAMPLE 31

Preparation of Small Core/Shell Acetoacetoxy-Containing Waterborne Polymer Latex To a 3000 mL resin kettle equipped with a condenser, nitrogen purge, and subsurface feed tube were added 720 g of water, 39.2 g of HITENOL HS-20, 1.54 g of TERGITOL NP-40 (70%), 5.84 g of ammonium bicarbonate, 26.14 g of methyl methacrylate, 35.2 g of styrene, 26.4 g of 2-ethylhexyl acrylate, and 0.264 g of trimethylolpropane triacrylate. A nitrogen purge was begun, then the contents of the reactor brought up to 80° C. at 400 rpm. After reaching 80° C., an initiator solution composed of 6.16 g of ammonium persulfate dissolved in 34.84 g of water was added to the reactor. An initiator solution composed of 2.08 g of ammonium persulfate dissolved in 53.6 g of water was started at 0.336 g/min. Thirty minutes after the initiator feed was begun, an emulsion feed composed of 153.6 g of water, 15.72 g of AEROSOL 18, 15.72 g of TERGITOL NP-40 (70%), 110.4 g of methyl methacrylate, 148.7 g of styrene, 111.52 g of 2-ethylhexyl acrylate, and 1.12 g of trimethylolpropane triacrylate was begun at 5.24 g/min. After the first emulsion feed was completed, the feed lines were washed with 80 g of water, and the temperature held at 80° C. for 30 minutes. The reactor was then cooled to 65° C., and an initiator solution of 2.74 g of sodium formaldehyde sulfoxylate dissolved in 16 g of water, and 5.05 g of a catalyst solution composed of 0.5% iron (II) sulfate chelated with ethylenediamine tetracetic acid were added to the reactor. A second emulsion feed composed of 138.4 g of water, 9.72 g of AEROSOL 18, 9.98 g of TERGITOL NP-40 (70%), 191.90 g of styrene, 45.6 g of methyl methacrylate, 143.92 g of 2-ethylhexyl acrylate, 95.95 g of acetoacetoxy-ethyl methacrylate, and 4.72 g of the sodium 2-acrylamido-2-methylpropanesulfonate (50% in water) was fed at 5.24 g/min. A solution of 3.92 g of t-butylhydroperoxide dissolved in 32 g of water was fed into the reactor during the second emulsion feed at 0.14 g/min. After the t-butylhydroperoxide feed was completed, heating was continued for 30 minutes. The latex was then filtered through 100 mesh wire screen. Solids level, 44.9; amount of dried material (100 mesh screen), 1.5 g; particle size (Dw), 72 nm.

EXAMPLE 32

Preparation of Small Core/Shell Amine-Containing Waterborne Polymer Latex

To a 400 mL resin kettle equipped with a condenser, nitrogen purge, and subsurface feed tube were added 900 g of water, 49 g of HITENOL HS-20, 1.93 g of TERGITOL NP-40 (70%), 7.3 g of sodium carbonate, 32.67 g of methyl methacrylate, 44 g of styrene, 33 g of 2- ethylhexyl acrylate, and 0.33 g of trimethylolpropane triacrylate. A nitrogen purge was begun, then the contents of the reactor brought up to 80° C. at 400 rpm. After reaching 80° C., an initiator solution composed of 7.70 g of sodium persulfate dissolved in 43.55 g of water was added to the reactor. An initiator solution composed of 2.61 g of sodium persulfate dissolved in 67 g of water was started at 0.42 g/min. Thirty minutes after the initiator feed was begun, an emulsion feed composed of 192 g of water, 19.65 g of AEROSOL 18, 19.65 g of TERGITOL NP-40 (70%), 138.01 g of methyl methacrylate, 185.88 g of styrene, 139.41 g of 2-ethylhexyl acrylate, and 1.394 g of trimethylolpropane triacrylate was begun at 6.56 g/min. After the first emulsion feed was completed, the feed lines were washed with 80 g of water, and the temperature held at 80° C. for 30 minutes. The reactor was then cooled to 65° C., and an initiator solution of 3.42 g of sodium formaldehyde sulfoxylate dissolved in 20 g of water, and 6.31 g of a catalyst solution composed of 0.5% iron (II) sulfate chelated with ethylenediamine tetracetic acid were added to the reactor. A second emulsion feed composed of 173 g of water, 12.15 g of AEROSOL 18, 12.48 g of TERGITOL NP40 (70%), 239.88 g of styrene, 54.06 g of methyl methacrylate, 179.91 g of 2-ethylhexyl acrylate, 119.94 g of acetoacetoxyethyl methacrylate, and 11.81 g of the sodium 2-acrylamido-2- methylpropanesulfonate (50% in water) was fed at 6.56 g/min. A solution of 4.9 g of t-butylhydroperoxide dissolved in 40 g of water was fed into the reactor during the second emulsion feed at 0.14 g/min. After the t-butylhydroperoxide feed was completed, heating was continued for 30 minutes. The emulsion was cooled to less than 35° C., and 202.53 g of polyethylenimine (50%) were pumped in over 15 minutes. The latex was then filtered through 100 mesh wire screen. Solids level, 44.7; amount of dried material (100 mesh screen), 1.3 g; particle size (Dw), 56 nm; pH, 10.5.

EXAMPLE 33

Preparation of a low pH blend using the Latexes from Examples 31 and 32

To 234.6 g of Example 32 were added with stirring 700 g of Example 31; pH, 10.5. While stirring the blend of Example 31 and 32, 25.2 g of ammonium bicarbonate (25% in water) was added. The pH was 9.2. Samples of this blend were stable at 60° C. for greater than 14 days.

EXAMPLE 34

Evaluation of Latex Blend from Example 33

To 100 parts of the latex blend from Example 33 were added with stirring 5.4 parts of TEXANOL. After twenty-four hours 6-mil films were cast over leneta paper, the films air dried for 15 minutes, then dried at 60° C. for 15 minutes in a forced-air oven. A drop of pure water and a drop from a 50% solution of ethanol in water were placed on the surface of the cured films, then covered for 1 hour to prevent evaporation of the drop. After 1 hour, no effect of water or the ethanol solution was observed on the film. This test demonstrates that the cured films have outstanding water and ethanol resistance.

EXAMPLE 35

Preparation of small acetoacetoxy-containing 49/51 (w/v) core/shell polymer particle Duplicate runs of Example 35 were prepared and blended to make a master batch. To a 3000 mL resin kettle equipped with a condenser, nitrogen purge, and subsurface feed tube were added 900.5 g of water, 49 g of HITENOL HS-20, 1.987 g of TERGITOL 15-S40 (68%), 31.9 g of methyl methacrylate, 44 g of styrene, 33 g of 2-ethylhexyl acrylate, 1.1 g trimethylolpropane triacrylate, and 7.3 g of sodium carbonate. A nitrogen purge was begun, then the contents of the reactor brought up to 80° C. at 350 rpm. After reaching 80° C., an initiator charge composed of 7.54 g of sodium persulfate dissolved in 43.55 g of water was added to the reactor. An emulsion feed composed of 245.5 g of water, 19.65 g of AEROSOL 18, 20.23 g of TERGITOL 15-S-40, 134.76 g of methyl methacrylate, 185.88 g of styrene, 139.41 g of 2-ethylhexyl acrylate, and 4.647 g of trimethylolpropane triacrylate was begun at 5.248 g/min. Five minutes after the first emulsion feed was begun, an initiator solution composed of 4.26 g of sodium persulfate dissolved in 109 g of water was fed at 0.336 g/min. After the first emulsion feed was completed, the feed line was flushed with 20 g of water and the reaction was held at 80° C. for 30 minutes. Then a second emulsion feed composed of 169 g of water, 12.15 g of Aerosol 18, 12.85 g of TERGITOL 15-S-40, 239.68 g of styrene, 54.06 g of methyl methacrylate, 179.91 g of 2-ethylhexyl acrylate, 119.94 g of acetoacetoxyethyl methacrylate, 11.81 g of the sodium 2-acrylamido-2-methylpropanesulfonate (50% in water) and 6.12 g of Drewplus L-483 (a defoamer) was fed at 5.248 g/min. After the last feed, the reaction was held for 10 minutes at 80° C. then cooled to 65° C. over the next 20 minutes. Then the reactor was charged with a solution of 1 g of isoascorbic acid in 20 g water and 0.5 g of iron (II) sulfate. Over the next 30 minutes, a solution of 0.72 g of t-butyl hydroperoxide in 20 g of water was fed into the reactor while heating continued. The emulsion was cooled, and filtered through 100 mesh wire screen. For run 1: solids level, 44.59; amount of dried material (100 mesh screen), 2.49 g; For run 2: solids level, 44.97, amount of dried material (100 mesh screen), 1.81 g. The combined batches had a solids level of 44.53, a particle size of 71.0 nm (Dw) with a monomodal distribution.

EXAMPLE 36

Preparation of large acetoacetoxy-containing 65/35 (w/w) core/shell structured polymer particle Fourteen replicate runs of Example 36 were prepared and blended to make a master batch. The following preparation was used.

To a 3000 mL resin kettle equipped with a condenser, nitrogen purge, and subsurface feed tube were added 600.6 g of water, 1.62 g of HITENOL HS-20, 1.98 g of TERGI- TOL NP40 (70%), and 7.3 g of sodium carbonate. A nitrogen purge was begun, then the contents of the reactor brought up to 80° C. at 400 rpm. After reaching 80° C., an initiator charge composed of 7.705 g of sodium persulfate dissolved in 43.55 g of water was added to the reactor. An emulsion feed composed of 355 g of water, 3.26 g of AERSOL OT-75 (75% in water), 10.51 g of TERGITOL 15-S-40 (70% in water), 382.85 g of methyl methacrylate, 111.38 g of styrene, 266.37 g of 2-ethylhexyl acrylate, and 1.75 g of trimethylolpropane triacrylate was begun at 4.59 g/min. Five minutes after the first emulsion feed was begun, an initiator solution composed of 4.36 g of sodium persulfate dissolved in 112.22 g of water was fed at 0.294 g/min. After the first emulsion feed was completed, the feed line was washed with 50 g of water and the reaction was held at 80° C. for 30 minutes. Then a second emulsion feed composed of 172.5 g of water, 10.93 g of AEROSOL 18, 5.27 g of TERGITOL 15-S40, 178.31 g of styrene, 66.56 g of 2-ethylhexyl acrylate, 141.45 g of acetoacetoxyethyl methacrylate, and 1.68 g of the sodium 2-acrylamido-2-methylpropanesulfonate (50% in water) was fed at 7 g/min. After the last feed, the reaction was held for 10 minutes at 80° C. then cooled to 65° C. over the next 20 minutes. Then the reactor was charged with a solution of 1 g of isoascorbic acid in 20 g water and 0.72 g of iron (II) sulfate. Over the next 30 minutes, a solution of 0.72 g of t-butyl hydroperoxide in 20 g of water was fed into the reactor while heating continued. The emulsion was cooled, and filtered through 100 mesh wire screen.

The combined batches had a solids level of 46.74, a particle size of 254 nm (Dw) with a monomodal distribution. The particles appearance was the raspberry type by transmission electron microscopy. After blending, 5.116 g of PROXEL GL (biocide) was added to the masterbatch.

EXAMPLE 37

Preparation of large core/shell amine-functional particle from Example 36

To 2500 g of the latex of Example 36 were added over 15 minutes 72.52 g of LUPASOL G35 poly(ethylenimine) (50%). Total solids 46.66. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

EXAMPLE 38

Blend of latexes for Example 35 and 37

756.8 g of the acetoacetoxy-containing latex from Example 35 was weighed out. While stirring, 2166.74 g of the amine-latex from Example 37 were added, then 31.58 g of TERGITOL 15-S-40 (70% in water) (this was added to make the blend stable to coalescing solvents used in example Y5 below), and then 62.75 g of ammonium bicarbonate (25% in water). Total solids of the blend was 45.4%, visual MFFT of 28° C., resist MFFT of 36° C., viscosity of 19.5 cps, pH of 9.2.

EXAMPLE 39

Clear coating formulation using Example 38

The Example 38 blend was made into a clear coalescing formulation as shown on the table below.

The clear formula was allowed to equilibrate at least 24 hours before using.

TABLE 21

Clear Coalescing formulation for Example 38

| Ingredient: | Weight (grams): |
|---|---|
| Example 38 | 200 |
| Premix | 12.9 |
| SURFYNOL 104 DPM | 1.8 |
| Premix: | |
| EASTMAN EB | 7.8 |
| TEXANOL | 4.9 |
| Fluorad ™ FC-430* | 0.2 |

*(a nonionic fluorochemical wetting, leveling and flow control agent of the company 3M - added to help emulsion wet release paper)

TABLE 22

Tensile properties for Example 39

| Treatment | Ultimate Breaking Load (psi) | Ultimate Elongation (%) | Energy to Break (in-lb/in$^3$) | Initial Modulus (ksi) | Yield Load (psi) | Yield Elongation (%) |
|---|---|---|---|---|---|---|
| 4 days dry | 2454 | 215 | 1761 | 4.8 | 329 | 53 |
| 10 days dry | 2869 | 178 | 2001 | 12.6 | 509 | 30 |
| 60° C.** | 1622 | 197 | 1029 | 1.2 | 188 | 52 |
| 126° C.** | 3516 | 138 | 2902 | 54 | 1760 | 9 |

**samples were air-dried for 2 hours then baked at specified temperature for 15 minutes

EXAMPLE 40

Pigmented coating formulations using Example 38

TABLE 23

Initial Brush or Roller-type TiO$_2$ formulations using Example 38

| Grind 1 Ingredient: | Weight (grams): |
|---|---|
| Water | 125 |
| SURFUNOL 104 DPM | 22.6 |
| Disperse-AYD W-22 | 17.5 |
| NH$_4$OH (5%) | 4.1 |
| DREWPLUS L-493 | 1.52 |
| IGEPAL CO-630 | 11 |
| Ti-Pure R-706 | 875 |
| Water | 75 |

| Grind 2 Ingredient: | Weight (grams): |
|---|---|
| Water | 200 |
| PROXEL GXL | 4 |
| DISPERSE-AYD W-22 | 16.8 |
| IGEPRAL CO-630 | 8.55 |
| DREWPLUS L-493 | 8.05 |
| Ti-Pure R-706 | 840 |

| | Weight (grams): | | |
|---|---|---|---|
| Letdown Ingredient: | A: | B: | C: |
| Grind 1: | 42 | — | — |
| Grind 2: | — | 76.5 | 76.5 |
| Water | 3 | — | — |
| Example 38 | 139 | 139 | 139 |
| SURFYNOL 420 | — | 3.1 | 3.1 |
| DREWPLUS L-493 | .1 | 1.13 | 1.13 |
| TEXANOL | 4 | 3.8 | 3.8 |
| EASTMAN DM | — | 6.7 | — |
| Dibutyl Phthalate | 3.6 | 3.6 | — |
| EASTMAN EB | — | — | 5.04 |

TABLE 23-continued

| POLYPHOBE 102 | 1.1 | 1.24 | 1.22 |

Adjust to pH 9.2–9.8 with 28% NH₄OH

| Sample: | pH: | initial KU: | final pH (3 days): | final KU (3 days): |
|---|---|---|---|---|
| A | 9.3 | 69 | 9.2 | 86 |
| B | 9.3 | 63 | 9.0 | 93 |
| C | 9.3 | 64 | 9.0 | 93 |

TABLE 24

Appearance characteristics for TiO₂ formulations using Example 38

| Sample | Opacity | 20 degree Gloss | 60 degree Gloss | 85 degree Gloss | L color value | a color value | b color value | Days film dried: |
|---|---|---|---|---|---|---|---|---|
| A | 98.8 | 63 | 86 | 96 | 96.5 | −1.8 | 2.9 | 1 |
| B | 99.7 | 19 | 57 | 77 | 97.3 | −1.5 | 2.9 | 1 |
| C | 99.6 | 44 | 83 | 89 | 97.3 | −1.6 | 3.0 | 1 |

TABLE 25a

Perfomace characteristics after 1 day dry for TiO₂ formulations using Example 38

| Sample | 1 day Block: | 7 day Block: | Heated Block: | 1 day Print: | 7 day Print: | Heated Print: |
|---|---|---|---|---|---|---|
| A | 6 | 5 | 4 | 4 | 4 | 6 |
| B | 5 | 5 | 4 | 4 | 4 | 6 |
| C | 6 | 4 | 5 | 6 | 4 | 6 |

TABLE 25b

Performance cbaracteristics after 7 days dry for TiO₂ formulations using Example 38

| Sample | 1 day Block: | 7 day Block: | Heated Block: | 1 day Print: | 7 day Print: | Heated Print: |
|---|---|---|---|---|---|---|
| A | 6 | 5 | 5 | 6 | 4 | 6 |
| B | 6 | 6 | 6 | 6 | 6 | 8 |
| C | 7 | 6 | 6 | 6 | 6 | 8 |

TABLE 25c

Spot Resistance and MEK Double Rub Properties after 10 days dry for TiO₂ formulations using Example 38

| Sample: | MEK Double Rubs/mil: | Water | 50/50 Water/Ethanol | MEK | Toluene | 5% HCl | 5% NaOH |
|---|---|---|---|---|---|---|---|
| A | 58 | 4/1 | 4/4 | 5/4 | 1/1 | 4/1 | 1/1 |
| B | 61 | 4/5 | 4/4 | 5/4 | 1/1 | 1/1 | 1/1 |
| C | 63 | 4/5 | 4/4 | 5/4 | 1/1 | 1/1 | 1/1 |

For spot resistance and MEK double rub testing, samples were cast 7 mil wet on Alodine-treated aluminum. Two spots of the indicated liquid were placed on the coating, covered with a watch glass and then the coating was rated after 2 hours and 24 hours. A rating of 5 was given to the coating when it was untouched by the liquid and a rating of I given when the coating blistered and/or cracked. Some of the poorer results in spot testing may be due to lack of sufficient ambient cure or wetting problems versus coating formulation difficulties.

TABLE 25d

Tensile properties after 4 and 10 days dry for TiO₂ formulations using Example 38

| Sample - days dry: | Ultimate Breaking Load (psi) | Ultimate Elongation: (%) | Energy to Break: (in-lb/in³) | Initial Modulus: (ksi) | Yield Load: (psi) | Yield Elongation (%) |
|---|---|---|---|---|---|---|
| A - 4 | 1766 | 137 | 1033 | 4.5 | 271 | 23 |
| A - 10 | 2041 | 133 | 1179 | 5.0 | 307 | 23 |
| B - 4 | 1542 | 116 | 813 | 1.5 | 308 | 30 |
| B - 10 | 1659 | 121 | 907 | 1.7 | 295 | 28 |
| C - 4 | 1644 | 90 | 227 | 8.4 | 727 | 14 |
| C - 10 | 1577 | 83 | 660 | 10.2 | 660 | 12 |

EXAMPLE 41

Preparation of large acetoacetoxy-containing 65/35 (w/w) core/shell structured polymer particle To a 3000 mL resin kettle equipped with a condenser, nitrogen purse, and subsurface feed tube were added 600.6 g of water, 1.62 g of HITENOL HS-20, 1.98 g of TERGITOL NP-40 (70%), and 7.3 g of sodium carbonate. A nitrogen purge was begun, then the contents of the reactor brought up to 80° C. at 400 rpm. After reaching 80° C., an initiator charge composed of 7.705 g of sodium persulfate dissolved in 43.55 g of water was added to the reactor. An emulsion feed composed of 355 g of water, 3.44 g of AEROSOL OT-75 (75% in water), 10.51 g of TERGITOL 15-S049 (70% in water), 379.27 g of methyl methacrylate, 110.54 g of styrene, 266.62 g of 2-ethylhexyl acrylate, and 5.72 g of trimethylolpropane triacrylate was begun at 4.59 g/min. Five minutes after the first emulsion feed was begun, an initiator solution composed of 4.36 g of sodium persulfate dissolved in 112.22 g of water was fed at 0.294 g/min. After the first emulsion feed was completed, the feed line was washed with 50 g of water and the reaction was held at 80° C. for 30 minutes. Then a second emulsion feed composed of 172.4 g of water, 10.93 g of AEROSOL 18, 5.27 g of TERGITOL 15-S-40, 177.91 g of styrene, 66.56 g of 2-ethylhexyl acrylate, 141.87 g of acetoacetoxyethyl methacrylate, and 1.68 g of the sodium 2-acrylamido-2-methylpropanesulfonate (50% in water) was fed at 7 g/min. After the last feed, the reaction was held for 10 minutes at 80° C. then cooled to 65° C. over the next 20 minutes. Then the reactor was charged with a solution of 1 g of isoascorbic acid in 20 g of water and 0.72 g of 0.5% iron (II) sulfate. Over the next 30 minutes, a solution of 0.72 g of t-butyl hydroperoxide (70% in water) in 20 g of water was fed into the reactor while heating continued. The emulsion was cooled; and filtered through 100 mesh wire screen. Dried solids collected on 100 mesh screen =1.72 g. Total solids level of 47.57%, and a particle size of 252 nm (Dw) with a monomodal distribution. The particles appearance was the raspberry type by transmission electron microscopy.

EXAMPLE 42

Preparation of 50/50 (w/w) small core/shell structured amine-functional particle To a 3000 mL resin kettle equipped with a condenser, nitrogen purse, and subsurface feed tube were added 600.6 g of water, 1.62 g of HITENOL HS-20, 1.98 g of TERGITOL NP-40 (70%), and 7.3 g of sodium carbonate. A nitrogen purge was begun, then the contents of the reactor brought up to 80° C. at 400 rpm. After reaching 80° C., an initiator charge composed of 7.54 g of sodium persulfate dissolved in 43.55 g of water was added to the reactor. An emulsion feed composed of 246.5 g of water, 19.65 g of AEROSOL 18, 20.23 g of TERGITOL 15-S-40 (70% in water), 134.76 g of methyl methacrylate, 185.88 g of styrene, 139.41 g of 2-ethylhexyl acrylate, and 4.647 g of imethylolpropane triacrylate was begun at 5.248 g/min. Five minutes after the first emulsion feed was begun, an initiator solution composed of 4.26 g of sodium persulfate dissolved in 109 g of water was fed at 0.336 g/min. After the first emulsion feed was completed, the feed line was washed with 20 g of water and the reaction was held at 80° C. for 30 minutes. Then a second emulsion feed composed of 169 g of water, 12.15 g of Aerosol 18, 12.85 g of TERGITOL 15-S40 (68% in water), 239.68 g of styrene, 54.06 g of methyl methacrylate, 179.91 g of 2-ethylhexyl acrylate, 119.94 g of acetoacetoxyethyl methacrylate, and 11.81 g of the sodium 2-acrylamido-2-methylpropanesulfonate (50% in water) was fed at 7 g/min. After the last feed, the reaction was held for 10 minutes at 80° C. then cooled to 65° C. over the next 20 minutes. The reactor was then charged with a solution of 1 g of isoascorbic acid in 20 g of water and 0.72 g of 0.5% iron (II) sulfate. Over the next 30 minutes, a solution of 0.72 g of t-butyl hydroperoxide (70% in water) in 20 g of water was fed into the reactor while heating continued. The emulsion was cooled, then 244.97 g of Lupasol G35 poly) ethylenimine (50% in water) was fed into the emulsion and the emulsion was filtered through 100 mesh wire screen. Dried solids collected on 100 mesh screen =0.95 g. Total solids level of 44.77%.

EXAMPLE 43

Clear coalescing formulation blend of Example 41 with 42

The latexes Examples 41 and 42 were made into a clear coalescing blend formulation as shown on the table below. The solvent blend was composed of 52.8 g of TEXANOL ester alcohol mixed with 47.2 g of EASTMAN DM. Additional TERGITOL 15-S-40 was added to make the latex blend stable to the solvent blend.

The clear formula below was allowed to equilibrate at least 24 hours before using

TABLE 26

Clear Coalescing formulation for Example 43

| Ingredient: | Weight (grams): |
|---|---|
| Example 41 | 276.75 |
| Example 42 | 71.47 |
| TERGITOL 15-S-40 | 2.27 |
| 25% Ammonium Bicarbonate | 23.83 |
| Solvent Blend | 36.32 |
| pH | 8.09 |
| Viscosity | 25 |
| Onset/midpoint glass transition (Tg) °C.: | 14/24 |

EXAMPLE 44

Physical performance of clear films of Example 43

Tensile properties, MEK double rubs and various liquid spot resistance tests were performed on clear film samples of Example 43. For spot resistance and MEK double rub testing, samples were cast 7 mil wet on Alodine-treated aluminum. Two spots of the indicated liquid were placed on the coating, covered with a watch glass and then the coating was rated after 2 hours and 24 hours. A rating of 5 was given to the coating when it was untouched by the liquid, a rating of 4 for cloudy appearance, a rating of 3 for tacky feel and cloudy appearance, a rating of 2 for bubble formation and a rating of 1 given when the coating blistered and/or cracked.

TABLE 22

Tensile properties for Example 43

| Treatment | Ultimate Breaking Load (psi) | Ultimate Elongation (%) | Energy to Break (in-lb/in$^3$) | Initial Modulus (ksi) | Yield Load (psi) | Yield Elongation (5) |
|---|---|---|---|---|---|---|
| 4 days dry | 1853 | 146 | 928 | .97 | 220 | 46 |
| 10 days dry | 2202 | 184 | 1299 | 2.1 | 261 | 43 |
| 127° C.** | 3146 | 129 | 2540 | 53 | 1646 | 8.6 |

**samples were air-dried for 2–3 hours then baked at specified temperature for 15 minutes

| | MEK Double Rubs (per mil) and Spot Resistance Properties using Example 43 | | | | | |
|---|---|---|---|---|---|---|
| Days dry | MEK Double Rubs: | Water | 50/50 Water/ Ethanol | MEK | Toluene | 5% HCL | 5% NaOH |
| 4 days dry | 258 | 4/4 | 4/4 | 5/5 | 4/4 | 5/5 | 5/5 |
| 11 days | 30 | 4/5 | 4/5 | 5/5 | 4/4 | 4/5 | 5/4 |

The claimed invention is:

1. A water-based latex comprising dispersed waterborne amino-functional polymer particles, dispersed waterborne actoacetoxy-functional polymer particles, and water, wherein the amino-functional polymer is a polymeric (polyamino) enamine comprising the reaction product of a surfactant-stabilized acetoacetoxy-functional polymer and a poly(alkylenimine).

2. A latex of claim 1, wherein the acetoacetoxy-functional polymer has enamine-functional groups and allyl-functional groups.

3. A latex of claim 1, wherein the acetoacetoxy-functional polymer is an enamine-functional polymer.

4. A latex of claim 3, wherein the surfactant-stabilized acetoacetoxy-functional polymer comprises about 1 to about 40 weight percent of a monomer of Formula (1):

$$R^1\text{---}CH\text{==}C(R^2)C(O)\text{---}X^1\text{---}X^2\text{---}X^3\text{---}C(O)\text{---}CH_2\text{---}C(O)\text{---}R^3 \quad (1)$$

$R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N($R^1$)—, in which $R^1$ is a $C_1$–$C_6$ alkyl group; $X^2$ is a $C_1$–$C_{12}$ alkylene group or $C_3$–$C_{12}$ cycloalkylene group;

about 0.1 to about 10 weight percent of a non-self-polymerizing, surface-active vinyl monomer; and about 75 to about 90 weight percent of a non-acid vinyl monomer; and wherein the poly(alkylenimine) is poly (ethylenimine).

5. A latex of claim 4, wherein the monomer of Formula (1) is selected from acetoacetoxyethyl methacrylate, acetoacetoxyethyl acrylate, acetoacetoxy(methyl)ethyl acrylate, acetoacetoxypropyl acrylate, and acetoacetoxybutyl acrylate and the non-self-polymerizing, surface-active vinyl monomer is a polyoxyethylene alkyl phenyl ether of formula (3), (4), or (5):

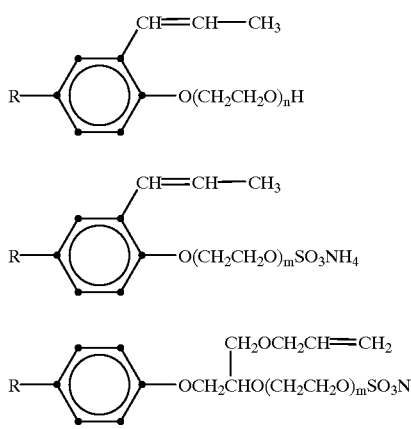

where R is nonyl or octyl, n ranges from 5 to 50, and m ranges from 15 to 40.

6. A latex of claim 4, comprising from about 5 to about 50 weight percent of the amino-functional polymer particles and about 50 to about 95 weight percent of the acetoacetoxy-functional polymer particles, based on weight dry resin and wherein the particle size of the amino-functional polymer particles ranges from about 25 to about 500 nm and the particle size of the acetoacetoxy-functional polymer particles ranges from about 25 to about 500 nm.

7. A latex of claim 6, wherein the particle size of the amino-functional polymer particles ranges from about 45 to about 80 nm.

8. A latex of claim 6, wherein the particle size of the amino-functional polymer particles ranges from about 110 to about 450 nm.

9. A latex of claim 1, wherein the surfactant-stabilized acetoacetoxy-functional polymer comprises about 1 to about 40 weight percent of a monomer of Formula (1):

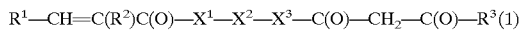

$$R^1—CH=C(R^2)C(O)—X^1—X^2—X^3—C(O)—CH_2—C(O)—R^3 \quad (1)$$

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N(R)—, in which $R^1$ is a $C_1$–$C_6$ alkyl group; $X^2$ is a $C_1$–$C_{12}$ alkylene group or $C_3$–$C_{12}$ cycloalkylene group;

about 0.1 to about 5 weight percent of a non-self-polymerizing, surface-active vinyl monomer; and about 75 to about 90 weight percent of a non-acid vinyl monomer; and wherein the poly(alkylenimine) is poly(ethylenimine).

10. A latex of claim 9, wherein the monomer of Formula (1) is selected from acetoacetoxyethyl methacrylate, acetoacetoxyethyl acrylate, acetoacetoxy(methyl)ethyl acrylate, acetoacetoxypropyl acrylate, and acetoacetoxybutyl acrylate and the non-self-polymerizing, surface-active vinyl monomer is a polyoxyethylene alkyl phenyl ether of formula (3), (4), or (5):

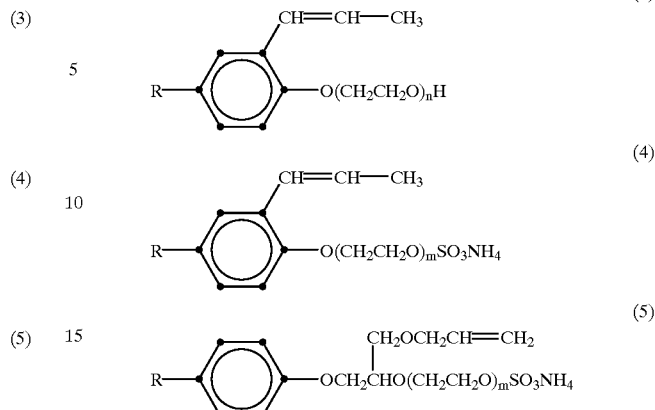

where R is nonyl or octyl, n ranges from 5 to 50, and m ranges from 15 to 40.

11. A latex of claim 9, comprising from about 5 to about 50 weight percent of the amino-functional polymer particles and about 50 to about 95 weight percent of the acetoacetoxy-functional polymer particles, based on weight dry resin and wherein the particle size of the amino-functional polymer particles ranges from about 25 to about 100 nm and the particle size of the acetoacetoxy-functional polymer particles ranges from about 45 to about 500 nm.

12. A latex of claim 9, comprising from about 5 to about 50 weight percent of the amino-functional polymer particles and about 50 to about 95 weight percent of the acetoacetoxy-functional polymer particles, based on weight dry resin and wherein the particle size of the amino-functional polymer particles ranges from about 110 to about 450 nm and the particle size of the acetoacetoxy-functional polymer particles ranges from about 25 to about 500 nm.

13. A water-based latex comprising dispersed waterborne amino-functional polymer particles, dispersed waterborne acetoacetoxy-functional polymer particles, a buffer and water; the latex having a pH ranging from about 7.0 to about 9.2 wherein the amino-functional polymer is a polymeric (polyamino enamine comprising the reaction product of a surfactant-stabilized acetoacetoxy-functional polymer and a poly(alkylenimine).

14. A latex of claim 13, wherein the buffer is ammonium bicarbonate, ammonium dihydrogenphosphate, or a mixture thereof.

15. A latex of claim 14, wherein the surfactant-stabilized acetoacetoxy-functional polymer comprises about 1 to about 40 weight percent of a monomer of Formula (1):

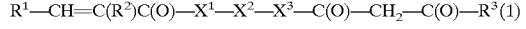

$$R^1—CH=C(R^2)C(O)—X^1—X^2—X^3—C(O)—CH_2—C(O)—R^3 \quad (1)$$

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N(R')—, in which R' is a $C_1$–$C_6$ alkyl group; $X^2$ is a $C_1$–$C_{12}$ alkylene group or $C_3$–$C_{12}$ cycloalkylene group;

about 0.1 to about 10 weight percent of a non-self-polymerizing, surface-active vinyl monomer; and about 75 to about 90 weight percent of a non-acid vinyl monomer; and wherein the poly(alkylenimine) is poly(ethylenimine).

16. A latex of claim 15, wherein the monomer of Formula (1) is selected from acetoacetoxyethyl methacrylate, acetoacetoxyethyl acrylate, acetoacetoxy(methyl)ethyl acrylate, acetoacetoxypropyl acrylate, and acetoacetoxybutyl acrylate and the non-self-polymerizing, surface-active vinyl monomer is a polyoxyethylene alkyl phenyl ether of formula (3), (4), or (5):

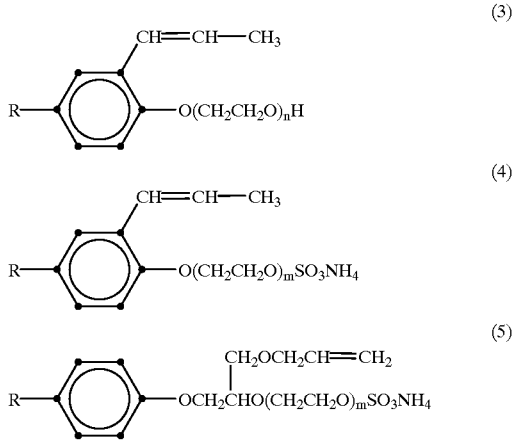

where R is nonyl or octyl, n ranges from 5 to 50, and m ranges from 15 to 40.

17. A latex of claim 15, comprising from about 5 to about 50 weight percent of the amino-functional polymer particles and about 50 to about 95 weight percent of the acetoacetoxy-functional polymer particles, based on weight dry resin and wherein the particle size of the amino-functional polymer particles ranges from about 25 to about 100 nm and the particle size of the acetoacetoxy-functional polymer particles ranges from about 25 to about 500 nm.

18. A latex of claim 15, comprising from about 5 to about 50 weight percent of the amino-functional polymer particles and about 50 to about 95 weight percent of the acetoacetoxy-functional polymer particles, based on weight dry resin and wherein the particle size of the amino-functional polymer particles ranges from about 110 to about 450 nm and the particle size of the acetoacetoxy-functional polymer particles ranges from about 25 to about 500 nm.

19. A coating composition comprising a latex of claim 1 and an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a curing agent, and a coalescing agent.

20. A coating composition comprising a latex of claim 2 and an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a curing agent, and a coalescing agent.

21. A coating composition comprising a latex of claim 9 and an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a curing agent, and a coalescing agent.

22. A coating composition comprising a latex of claim 16 and an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a curing agent, and a coalescing agent.

23. A method for preparing a water-based latex comprising the step of mixing a water-based latex containing dispersed waterborne amino-functional polymer particles and water with a water-based latex containing dispersed waterborne acetoacetoxy-functional polymer particles and water, wherein the amino-functional polymer is a polymeric (polyamino) enamine comprising the reaction product of a surfactant-stabilized acetoacetoxy-functional polymer and a poly(alkylenimine).

24. A method for preparing a buffered water-based latex comprising the step of mixing:

an ammonium buffer, a water-based latex containing dispersed waterborne amino-functional polymer particles and water, and a water-based latex containing dispersed waterborne acetoacetoxy-functional polymer particles and water, wherein the amino-functional polymer is a polymeric (polyamino) enamine comprising the reaction product of a surfactant-stabilized acetoacetoxy-functional polymer and a poly(alkylenimine).

25. A method of claim 24, wherein the amino-functional polymer is a polymeric (polyamino) enamine comprising the reaction product of a surfactant-stabilized acetoacetoxy-functional polymer and a poly(alkylenimine) and the buffer is ammonium bicarbonate, ammonium dihydrogenphosphate, or a mixture thereof.

26. A method for scavenging residual α,β-unsaturated, carbonyl- or electron withdrawing group-containing monomers from a polymer latex comprising the step of contacting a polymer latex having residual α,β-unsaturated, carbonyl- or electron withdrawing group-containing monomers with an effective amount of a latex of claim 1.

27. A method for scavenging residual α,β-unsaturated, carbonyl- or electron withdrawing group-containing monomers from a polymer latex comprising the step of contacting a polymer latex having residual α,β-unsaturated, carbonyl- or electron withdrawing group-containing monomers with an effective amount of a latex of claim 9.

28. A method for scavenging residual α,β-unsaturated, carbonyl- or electron withdrawing group-containing monomers from a polymer latex comprising the step of contacting a polymer latex having residual α,β-unsaturated, carbonyl- or electron withdrawing group-containing monomers with an effective amount of a latex of claim 15.

* * * * *